United States Patent
Borkowski et al.

(10) Patent No.: US 12,556,271 B2
(45) Date of Patent: Feb. 17, 2026

(54) SIGNAL ANALYSIS CAPABILITY

(71) Applicant: NOKIA SOLUTIONS AND NETWORKS OY, Espoo (FI)

(72) Inventors: Robert Borkowski, Murray Hill, NJ (US); Vincent Houtsma, New Providence, NJ (US); Doutje Van Veen, New Providence, NJ (US); Amitkumar Mahadevan, Edison, NJ (US); Kovendhan Vijayan, Edison, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 320 days.

(21) Appl. No.: 18/331,919

(22) Filed: Jun. 8, 2023

(65) Prior Publication Data
US 2024/0413902 A1    Dec. 12, 2024

(51) Int. Cl.
*H04B 10/079* (2013.01)
(52) U.S. Cl.
CPC .............................. *H04B 10/0795* (2013.01)
(58) Field of Classification Search
CPC .................................................. H04B 10/0795
See application file for complete search history.

(56) References Cited

U.S. PATENT DOCUMENTS

| | | | |
|---|---|---|---|
| 2019/0074910 A1* | 3/2019 | Seo | H04B 10/69 |
| 2019/0383873 A1* | 12/2019 | Hojabri | G01R 31/3187 |
| 2021/0160108 A1* | 5/2021 | Sasaki | H04B 10/60 |
| 2022/0373598 A1* | 11/2022 | Tan | G01R 31/31924 |

OTHER PUBLICATIONS

G.9804.2, "Higher speed passive optical networks—Common transmission convergence layer specification", ITU-T, Sep. 2021 (Year: 2021).*
Michael G. Hart, Christopher P. Duff, and Stephen W. Hinch, "Firmware Measurement Algorithms for the HP 83480 Digital Communications Analyzer," Hewlett-Packard Journal, Dec. 1996, pp. 13-21. Available online: https://www.hpl.hp.com/hpjournal/pdfs/IssuePDFs/1996-12.pdf.

(Continued)

*Primary Examiner* — Shi K Li
(74) *Attorney, Agent, or Firm* — Tong, Rea, Bentley & Kim, LLC

(57) ABSTRACT

Various example embodiments of a signal analysis capability are presented herein. The signal analysis capability may be configured to support analysis of a signal for determining the signal integrity of the signal, where the signal integrity of the signal corresponds to a set of one or more measures of the quality of an electrical signal (e.g., one or more signal integrity metrics indicative of the signal integrity of the signal). The signal analysis capability may be configured to support analysis of a signal for determining the signal integrity of the signal for various types of signals which may be communicated within various types of communication networks. The signal analysis capability may be configured to support analysis of a signal for determining the signal integrity of the signal where the signal may include various types of data traffic (e.g., live data traffic, user data traffic, test data traffic, or the like).

19 Claims, 9 Drawing Sheets

(56) References Cited

OTHER PUBLICATIONS

J. King, D. Leyba and G. D. Le Cheminant, TDECQ (transmitter dispersion eye closure quaternary) replaces historic eye-mask and TDP test for 400 Gb/s PAM4 optical transmitters,: Optical Fiber Communications Conference (OFC), Los Angeles, CA, USA, 2017.
Greg D. Le Cheminant, "TDECQ for PAM4 Optical Transmitters: Does it really work", DesignCon 2019. Available online: https://shb.skku.edu/_custom/skk/_common/board/download.jspattach_no=50709.
"IEEE Standard for Ethernet," in IEEE Std 802.3-2022 (Revision of IEEE Std 802.3-2018) Clause 95.8.5 (TDEC) and 121.8.5 and 1228.5 (TDECQ), Jul. 2022, doi: 10.1109/IEEESTD.2022.9844436, pp. 3865-3868, 4914-4920, 4950-4952.
"50-Gigabit-capable passive optical networks (50G-PON): Physical media dependent (PMD) layer specification," in ITU T Recommendation G.9804.3, Clause 9.2.7.8, Sep. 2021.
Extended European Search Report for EP Patent Application No. 24180641.3-1206, dated Oct. 17, 2024, 10 pages.
ITU-T, "G.9804.3 : 50G Upstream ONU Tx TDEC test," ITU-T Draft, Study Group 15, Series SG15-C0223, Sep. 19, 2022, 8 pages.
ITU-T, "ITU-T Recommendation G.9804.2 Amendmend1 Higher Speed Passive Optical Networks-Common Transmission Convergence Layer Specification (for consent)," ITU-T, Study Group 15, Series SG15-TD73/PLEN, XP044345587, Sep. 19, 2022, 248 pages.

* cited by examiner

*FIG. 2*
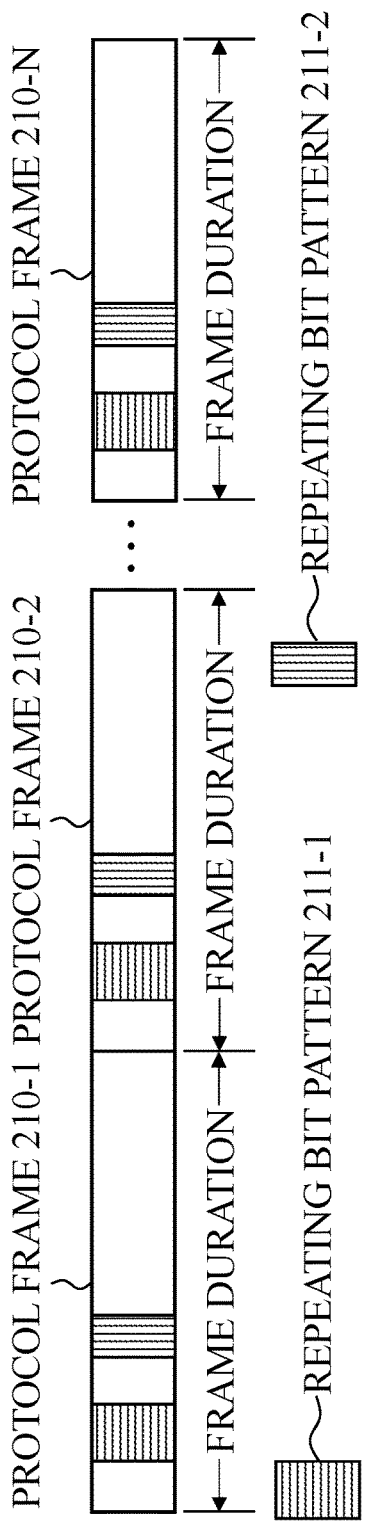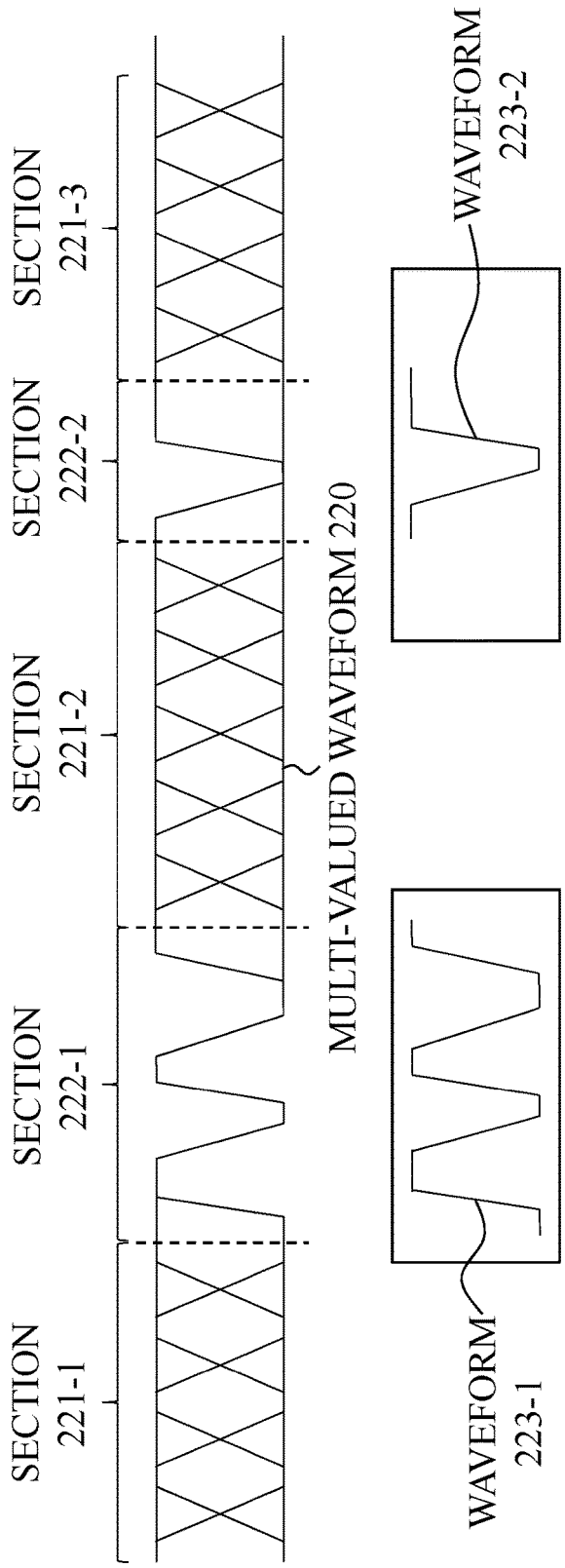

*FIG. 5*
SIGNAL INTEGRITY METRIC CALCULATION FUNCTION 500
WAVEFORM 501-1
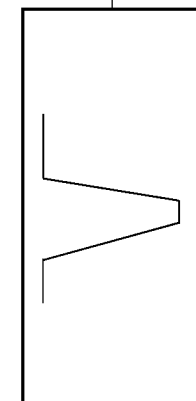
WAVEFORM 501-2
AT LEAST ONE OF
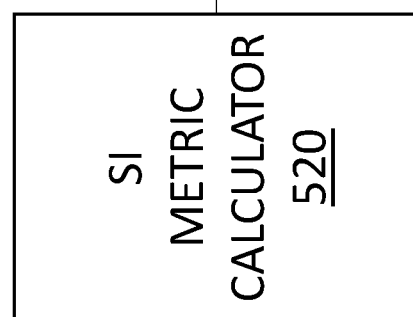
WAVEFORM PROCESSOR 510
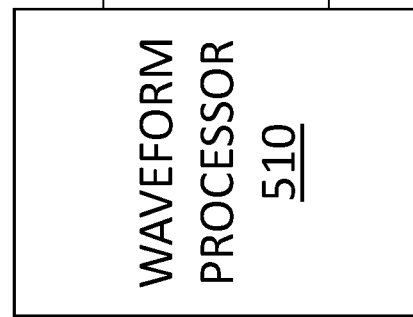
SI METRIC CALCULATOR 520
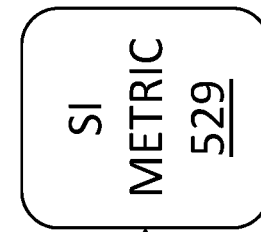
SI METRIC 529

SIGNAL ANALYSIS CAPABILITY

TECHNICAL FIELD

Various example embodiments relate generally to communication systems and, more particularly but not exclusively, to supporting signal analysis in optical communication systems.

BACKGROUND

In communication networks, various communications technologies may be used to support various types of communications.

SUMMARY

In at least some example embodiments, an apparatus includes at least one processor and at least one memory storing instructions which, when executed by the at least one processor, cause the apparatus at least to determine, within a multi-valued waveform recorded from a received signal including a plurality of protocol frames that are based on a protocol, a position of a repeating symbol pattern that repeats across the plurality of protocol frames, extract, from the multi-valued waveform based on the position of the repeating symbol pattern, a waveform of the repeating symbol pattern, and calculate, based on the waveform of the repeating symbol pattern, a signal integrity metric of the received signal. In at least some example embodiments, the position of the repeating symbol pattern is determined using a cross-correlation or convolution with a known symbol pattern of a protocol frame structure of the protocol frames of the protocol. In at least some example embodiments, the cross-correlation or convolution within the known symbol pattern of the protocol frame structure of the protocol frames of the protocol is performed after application of at least one of upsampling or filtering to the known symbol pattern of the protocol frame structure of the protocol frames of the protocol. In at least some example embodiments, the position of the repeating symbol pattern is determined using matched filtering and threshold qualification. In at least some example embodiments, the protocol is a passive optical network (PON) protocol, the protocol frames are downstream physical PON frames based on a downstream physical PON frame format that includes a downstream physical synchronization block (PSBd), and the repeating symbol pattern is located within the PSBd. In at least some example embodiments, the repeating symbol pattern is one of: a PSync field of the PSBd, at least a portion of a superframe counter (SFC) structure of the PSBd, or at least a portion of an operation control (OC) structure of the PBSd. In at least some example embodiments, the protocol is a passive optical network (PON) protocol, the protocol frames are upstream physical PON frames based on an upstream physical PON frame format, and the repeating symbol pattern is one of an upstream delimiter or an upstream burst preamble. In at least some example embodiments, the instructions, when executed by the at least one processor, cause the apparatus at least to calculate the signal integrity metric of the received signal based on a signal integrity metric calculation performed based on the waveform of the repeating symbol pattern. In at least some example embodiments, the instructions, when executed by the at least one processor, cause the apparatus at least to perform waveform processing on the waveform of the repeating symbol pattern to provide a processed waveform and calculate the signal integrity metric of the received signal based on a signal integrity metric calculation performed based on the processed waveform. In at least some example embodiments, the instructions, when executed by the at least one processor, cause the apparatus at least to calculate a first signal integrity metric based on a first signal integrity metric calculation performed based on the waveform of the repeating symbol pattern, perform waveform processing on the waveform of the repeating symbol pattern to provide a processed waveform, calculate a second signal integrity metric based on a second signal integrity metric calculation performed based on the processed waveform, and calculate the signal integrity metric of the received signal based on processing of the first signal integrity metric and the second signal integrity metric. In at least some example embodiments, the instructions, when executed by the at least one processor, cause the apparatus at least to obtain, based on the plurality of protocol frames, an eye diagram for the received signal. In at least some example embodiments, the instructions, when executed by the at least one processor, cause the apparatus at least to calculate the signal integrity metric of the received signal based on a signal integrity metric calculation performed based on the eye diagram for the received signal. In at least some example embodiments, the instructions, when executed by the at least one processor, cause the apparatus at least to perform eye-related processing on the eye diagram for the received signal to provide a processed eye diagram and calculate the signal integrity metric of the received signal based on a signal integrity metric calculation performed based on the processed eye diagram. In at least some example embodiments, the instructions, when executed by the at least one processor, cause the apparatus at least to perform signal processing on the waveform of the repeating symbol pattern and the eye diagram for the received signal to provide an output signal and calculate the signal integrity metric of the received signal based on a signal integrity metric calculation performed based on the output signal. In at least some example embodiments, the instructions, when executed by the at least one processor, cause the apparatus at least to determine, within the multi-valued waveform recorded from the received signal, a second position of a second repeating symbol pattern that repeats across the plurality of protocol frames, extract, from the multi-valued waveform based on the second position of the second repeating symbol pattern, a second waveform of the repeating symbol pattern, and calculate, based on the second waveform of the second repeating symbol pattern, the signal integrity metric of the received signal. In at least some example embodiments, the instructions, when executed by the at least one processor, cause the apparatus at least to perform waveform processing on the waveform of the repeating symbol pattern to provide a first processed waveform and on the second waveform of the second repeating symbol pattern to provide a second processed waveform and calculate the signal integrity metric of the received signal based on a signal integrity metric computation performed based on the first processed waveform and the second processed waveform. In at least some example embodiments, the instructions, when executed by the at least one processor, cause the apparatus at least to perform waveform processing on the waveform of the repeating symbol pattern to provide a first processed waveform and on the second waveform of the second repeating symbol pattern to provide a second processed waveform, calculate a first signal integrity metric based on a first signal integrity metric computation performed based on the first processed waveform and the second processed waveform, calculate a second signal integrity metric based on a second integrity metric computation performed based on the waveform of the repeating symbol pattern and the second waveform of the repeating symbol pattern, and calculate the signal integrity metric of the received signal based on a signal integrity metric processing configured to adjust the first signal integrity metric based on the second signal integrity metric. In at least some example embodiments, the signal integrity metric includes at least one of an eye/eye-mask test after equalization (EYE-EQ) metric, a transmitter dispersion eye closure after equalization (TDEC-EQ) metric, or a transmitter dispersion eye closure quaternary after equalization (TDECQ-EQ) metric. In at least some example embodiments, the received signal includes data traffic.

In at least some example embodiments, a non-transitory computer-readable medium stores computer program instructions which, when executed by an apparatus, cause the apparatus at least to determine, within a multi-valued waveform recorded from a received signal including a plurality of protocol frames that are based on a protocol, a position of a repeating symbol pattern that repeats across the plurality of protocol frames, extract, from the multi-valued waveform based on the position of the repeating symbol pattern, a waveform of the repeating symbol pattern, and calculate, based on the waveform of the repeating symbol pattern, a signal integrity metric of the received signal. In at least some example embodiments, the position of the repeating symbol pattern is determined using a cross-correlation or convolution with a known symbol pattern of a protocol frame structure of the protocol frames of the protocol. In at least some example embodiments, the cross-correlation or convolution within the known symbol pattern of the protocol frame structure of the protocol frames of the protocol is performed after application of at least one of upsampling or filtering to the known symbol pattern of the protocol frame structure of the protocol frames of the protocol. In at least some example embodiments, the position of the repeating symbol pattern is determined using matched filtering and threshold qualification. In at least some example embodiments, the protocol is a passive optical network (PON) protocol, the protocol frames are downstream physical PON frames based on a downstream physical PON frame format that includes a downstream physical synchronization block (PSBd), and the repeating symbol pattern is located within the PSBd. In at least some example embodiments, the repeating symbol pattern is one of: a PSync field of the PSBd, at least a portion of a superframe counter (SFC) structure of the PSBd, or at least a portion of an operation control (OC) structure of the PBSd. In at least some example embodiments, the protocol is a passive optical network (PON) protocol, the protocol frames are upstream physical PON frames based on an upstream physical PON frame format, and the repeating symbol pattern is one of an upstream delimiter or an upstream burst preamble. In at least some example embodiments, the computer program instructions, when executed by the apparatus, cause the apparatus at least to calculate the signal integrity metric of the received signal based on a signal integrity metric calculation performed based on the waveform of the repeating symbol pattern. In at least some example embodiments, the computer program instructions, when executed by the apparatus, cause the apparatus at least to perform waveform processing on the waveform of the repeating symbol pattern to provide a processed waveform and calculate the signal integrity metric of the received signal based on a signal integrity metric calculation performed based on the processed waveform. In at least some example embodiments, the computer program instructions, when executed by the apparatus, cause the apparatus at least to calculate a first signal integrity metric based on a first signal integrity metric calculation performed based on the waveform of the repeating symbol pattern, perform waveform processing on the waveform of the repeating symbol pattern to provide a processed waveform, calculate a second signal integrity metric based on a second signal integrity metric calculation performed based on the processed waveform, and calculate the signal integrity metric of the received signal based on processing of the first signal integrity metric and the second signal integrity metric. In at least some example embodiments, the computer program instructions, when executed by the apparatus, cause the apparatus at least to obtain, based on the plurality of protocol frames, an eye diagram for the received signal. In at least some example embodiments, the computer program instructions, when executed by the apparatus, cause the apparatus at least to calculate the signal integrity metric of the received signal based on a signal integrity metric calculation performed based on the eye diagram for the received signal. In at least some example embodiments, the computer program instructions, when executed by the apparatus, cause the apparatus at least to perform eye-related processing on the eye diagram for the received signal to provide a processed eye diagram and calculate the signal integrity metric of the received signal based on a signal integrity metric calculation performed based on the processed eye diagram. In at least some example embodiments, the computer program instructions, when executed by the apparatus, cause the apparatus at least to perform signal processing on the waveform of the repeating symbol pattern and the eye diagram for the received signal to provide an output signal and calculate the signal integrity metric of the received signal based on a signal integrity metric calculation performed based on the output signal. In at least some example embodiments, the computer program instructions, when executed by the apparatus, cause the apparatus at least to determine, within the multi-valued waveform recorded from the received signal, a second position of a second repeating symbol pattern that repeats across the plurality of protocol frames, extract, from the multi-valued waveform based on the second position of the second repeating symbol pattern, a second waveform of the repeating symbol pattern, and calculate, based on the second waveform of the second repeating symbol pattern, the signal integrity metric of the received signal. In at least some example embodiments, the computer program instructions, when executed by the apparatus, cause the apparatus at least to perform waveform processing on the waveform of the repeating symbol pattern to provide a first processed waveform and on the second waveform of the second repeating symbol pattern to provide a second processed waveform and calculate the signal integrity metric of the received signal based on a signal integrity metric computation performed based on the first processed waveform and the second processed waveform. In at least some example embodiments, the computer program instructions, when executed by the apparatus, cause the apparatus at least to perform waveform processing on the waveform of the repeating symbol pattern to provide a first processed waveform and on the second waveform of the second repeating symbol pattern to provide a second processed waveform, calculate a first signal integrity metric based on a first signal integrity metric computation performed based on the first processed waveform and the second processed waveform, calculate a second signal integrity metric based on a second integrity metric computation performed based on the waveform of the repeating symbol pattern and the second waveform of the repeating symbol pattern, and calculate the signal integrity metric of the received signal based on a signal integrity metric processing configured to adjust the first signal integrity metric based on the second signal integrity metric. In at least some example embodiments, the signal integrity metric includes at least one of an eye/eye-mask test after equalization (EYE-EQ) metric, a transmitter dispersion eye closure after equalization (TDEC-EQ) metric, or a transmitter dispersion eye closure quaternary after equalization (TDECQ-EQ) metric. In at least some example embodiments, the received signal includes data traffic.

In at least some example embodiments, a method includes determining, within a multi-valued waveform recorded from a received signal including a plurality of protocol frames that are based on a protocol, a position of a repeating symbol pattern that repeats across the plurality of protocol frames, extracting, from the multi-valued waveform based on the position of the repeating symbol pattern, a waveform of the repeating symbol pattern, and calculating, based on the waveform of the repeating symbol pattern, a signal integrity metric of the received signal. In at least some example embodiments, the position of the repeating symbol pattern is determined using a cross-correlation or convolution with a known symbol pattern of a protocol frame structure of the protocol frames of the protocol. In at least some example embodiments, the cross-correlation or convolution within the known symbol pattern of the protocol frame structure of the protocol frames of the protocol is performed after application of at least one of upsampling or filtering to the known symbol pattern of the protocol frame structure of the protocol frames of the protocol. In at least some example embodiments, the position of the repeating symbol pattern is determined using matched filtering and threshold qualification. In at least some example embodiments, the protocol is a passive optical network (PON) protocol, the protocol frames are downstream physical PON frames based on a downstream physical PON frame format that includes a downstream physical synchronization block (PSBd), and the repeating symbol pattern is located within the PSBd. In at least some example embodiments, the repeating symbol pattern is one of: a PSync field of the PSBd, at least a portion of a superframe counter (SFC) structure of the PSBd, or at least a portion of an operation control (OC) structure of the PBSd. In at least some example embodiments, the protocol is a passive optical network (PON) protocol, the protocol frames are upstream physical PON frames based on an upstream physical PON frame format, and the repeating symbol pattern is one of an upstream delimiter or an upstream burst preamble. In at least some example embodiments, the method includes calculating the signal integrity metric of the received signal based on a signal integrity metric calculation performed based on the waveform of the repeating symbol pattern. In at least some example embodiments, the method includes performing waveform processing on the waveform of the repeating symbol pattern to provide a processed waveform and calculating the signal integrity metric of the received signal based on a signal integrity metric calculation performed based on the processed waveform. In at least some example embodiments, the method includes calculating a first signal integrity metric based on a first signal integrity metric calculation performed based on the waveform of the repeating symbol pattern, performing waveform processing on the waveform of the repeating symbol pattern to provide a processed waveform, calculating a second signal integrity metric based on a second signal integrity metric calculation performed based on the processed waveform, and calculating the signal integrity metric of the received signal based on processing of the first signal integrity metric and the second signal integrity metric. In at least some example embodiments, the method includes obtaining, based on the plurality of protocol frames, an eye diagram for the received signal. In at least some example embodiments, the method includes calculating the signal integrity metric of the received signal based on a signal integrity metric calculation performed based on the eye diagram for the received signal. In at least some example embodiments, the method includes performing eye-related processing on the eye diagram for the received signal to provide a processed eye diagram and calculating the signal integrity metric of the received signal based on a signal integrity metric calculation performed based on the processed eye diagram. In at least some example embodiments, the method includes performing signal processing on the waveform of the repeating symbol pattern and the eye diagram for the received signal to provide an output signal and calculating the signal integrity metric of the received signal based on a signal integrity metric calculation performed based on the output signal. In at least some example embodiments, the method includes determining, within the multi-valued waveform recorded from the received signal, a second position of a second repeating symbol pattern that repeats across the plurality of protocol frames, extracting, from the multi-valued waveform based on the second position of the second repeating symbol pattern, a second waveform of the repeating symbol pattern, and calculating, based on the second waveform of the second repeating symbol pattern, the signal integrity metric of the received signal. In at least some example embodiments, the method includes performing waveform processing on the waveform of the repeating symbol pattern to provide a first processed waveform and on the second waveform of the second repeating symbol pattern to provide a second processed waveform and calculating the signal integrity metric of the received signal based on a signal integrity metric computation performed based on the first processed waveform and the second processed waveform. In at least some example embodiments, the method includes performing waveform processing on the waveform of the repeating symbol pattern to provide a first processed waveform and on the second waveform of the second repeating symbol pattern to provide a second processed waveform, calculating a first signal integrity metric based on a first signal integrity metric computation performed based on the first processed waveform and the second processed waveform, calculating a second signal integrity metric based on a second integrity metric computation performed based on the waveform of the repeating symbol pattern and the second waveform of the repeating symbol pattern, and calculating the signal integrity metric of the received signal based on a signal integrity metric processing configured to adjust the first signal integrity metric based on the second signal integrity metric. In at least some example embodiments, the signal integrity metric includes at least one of an eye/eye-mask test after equalization (EYE-EQ) metric, a transmitter dispersion eye closure after equalization (TDEC-EQ) metric, or a transmitter dispersion eye closure quaternary after equalization (TDECQ-EQ) metric. In at least some example embodiments, the received signal includes data traffic.

In at least some example embodiments, an apparatus includes means for determining, within a multi-valued waveform recorded from a received signal including a plurality of protocol frames that are based on a protocol, a position of a repeating symbol pattern that repeats across the plurality of protocol frames, means for extracting, from the multi-valued waveform based on the position of the repeating symbol pattern, a waveform of the repeating symbol pattern, and means for calculating, based on the waveform of the repeating symbol pattern, a signal integrity metric of the received signal. In at least some example embodiments, the position of the repeating symbol pattern is determined using a cross-correlation or convolution with a known symbol pattern of a protocol frame structure of the protocol frames of the protocol. In at least some example embodiments, the cross-correlation or convolution within the known symbol pattern of the protocol frame structure of the protocol frames of the protocol is performed after application of at least one of upsampling or filtering to the known symbol pattern of the protocol frame structure of the protocol frames of the protocol. In at least some example embodiments, the position of the repeating symbol pattern is determined using matched filtering and threshold qualification. In at least some example embodiments, the protocol is a passive optical network (PON) protocol, the protocol frames are downstream physical PON frames based on a downstream physical PON frame format that includes a downstream physical synchronization block (PSBd), and the repeating symbol pattern is located within the PSBd. In at least some example embodiments, the repeating symbol pattern is one of: a PSync field of the PSBd, at least a portion of a superframe counter (SFC) structure of the PSBd, or at least a portion of an operation control (OC) structure of the PBSd. In at least some example embodiments, the protocol is a passive optical network (PON) protocol, the protocol frames are upstream physical PON frames based on an upstream physical PON frame format, and the repeating symbol pattern is one of an upstream delimiter or an upstream burst preamble. In at least some example embodiments, the apparatus includes means for calculating the signal integrity metric of the received signal based on a signal integrity metric calculation performed based on the waveform of the repeating symbol pattern. In at least some example embodiments, the apparatus includes means for performing waveform processing on the waveform of the repeating symbol pattern to provide a processed waveform and means for calculating the signal integrity metric of the received signal based on a signal integrity metric calculation performed based on the processed waveform. In at least some example embodiments, the apparatus includes means for calculating a first signal integrity metric based on a first signal integrity metric calculation performed based on the waveform of the repeating symbol pattern, means for performing waveform processing on the waveform of the repeating symbol pattern to provide a processed waveform, means for calculating a second signal integrity metric based on a second signal integrity metric calculation performed based on the processed waveform, and means for calculating the signal integrity metric of the received signal based on processing of the first signal integrity metric and the second signal integrity metric. In at least some example embodiments, the apparatus includes means for obtaining, based on the plurality of protocol frames, an eye diagram for the received signal. In at least some example embodiments, the apparatus includes means for calculating the signal integrity metric of the received signal based on a signal integrity metric calculation performed based on the eye diagram for the received signal. In at least some example embodiments, the apparatus includes means for performing eye-related processing on the eye diagram for the received signal to provide a processed eye diagram and means for calculating the signal integrity metric of the received signal based on a signal integrity metric calculation performed based on the processed eye diagram. In at least some example embodiments, the apparatus includes means for performing signal processing on the waveform of the repeating symbol pattern and the eye diagram for the received signal to provide an output signal and means for calculating the signal integrity metric of the received signal based on a signal integrity metric calculation performed based on the output signal. In at least some example embodiments, the apparatus includes means for determining, within the multi-valued waveform recorded from the received signal, a second position of a second repeating symbol pattern that repeats across the plurality of protocol frames, means for extracting, from the multi-valued waveform based on the second position of the second repeating symbol pattern, a second waveform of the repeating symbol pattern, and means for calculating, based on the second waveform of the second repeating symbol pattern, the signal integrity metric of the received signal. In at least some example embodiments, the apparatus includes means for performing waveform processing on the waveform of the repeating symbol pattern to provide a first processed waveform and on the second waveform of the second repeating symbol pattern to provide a second processed waveform and means for calculating the signal integrity metric of the received signal based on a signal integrity metric computation performed based on the first processed waveform and the second processed waveform. In at least some example embodiments, the apparatus includes means for performing waveform processing on the waveform of the repeating symbol pattern to provide a first processed waveform and on the second waveform of the second repeating symbol pattern to provide a second processed waveform, means for calculating a first signal integrity metric based on a first signal integrity metric computation performed based on the first processed waveform and the second processed waveform, means for calculating a second signal integrity metric based on a second integrity metric computation performed based on the waveform of the repeating symbol pattern and the second waveform of the repeating symbol pattern, and means for calculating the signal integrity metric of the received signal based on a signal integrity metric processing configured to adjust the first signal integrity metric based on the second signal integrity metric. In at least some example embodiments, the signal integrity metric includes at least one of an eye/eye-mask test after equalization (EYE-EQ) metric, a transmitter dispersion eye closure after equalization (TDEC-EQ) metric, or a transmitter dispersion eye closure quaternary after equalization (TDECQ-EQ) metric. In at least some example embodiments, the received signal includes data traffic.

BRIEF DESCRIPTION OF THE DRAWINGS

The teachings herein can be readily understood by considering the following detailed description in conjunction with the accompanying drawings, in which:

FIG. 2 depicts an example embodiment for location and extraction of waveforms for repeating symbol patterns in protocol frames of a protocol;

FIG. 5 depicts an example embodiment of a signal integrity metric calculation function configured to determine a signal integrity metric for a received signal;

To facilitate understanding, identical reference numerals have been used herein, wherever possible, in order to designate identical elements that are common among the various figures.

DETAILED DESCRIPTION

Figure 1:
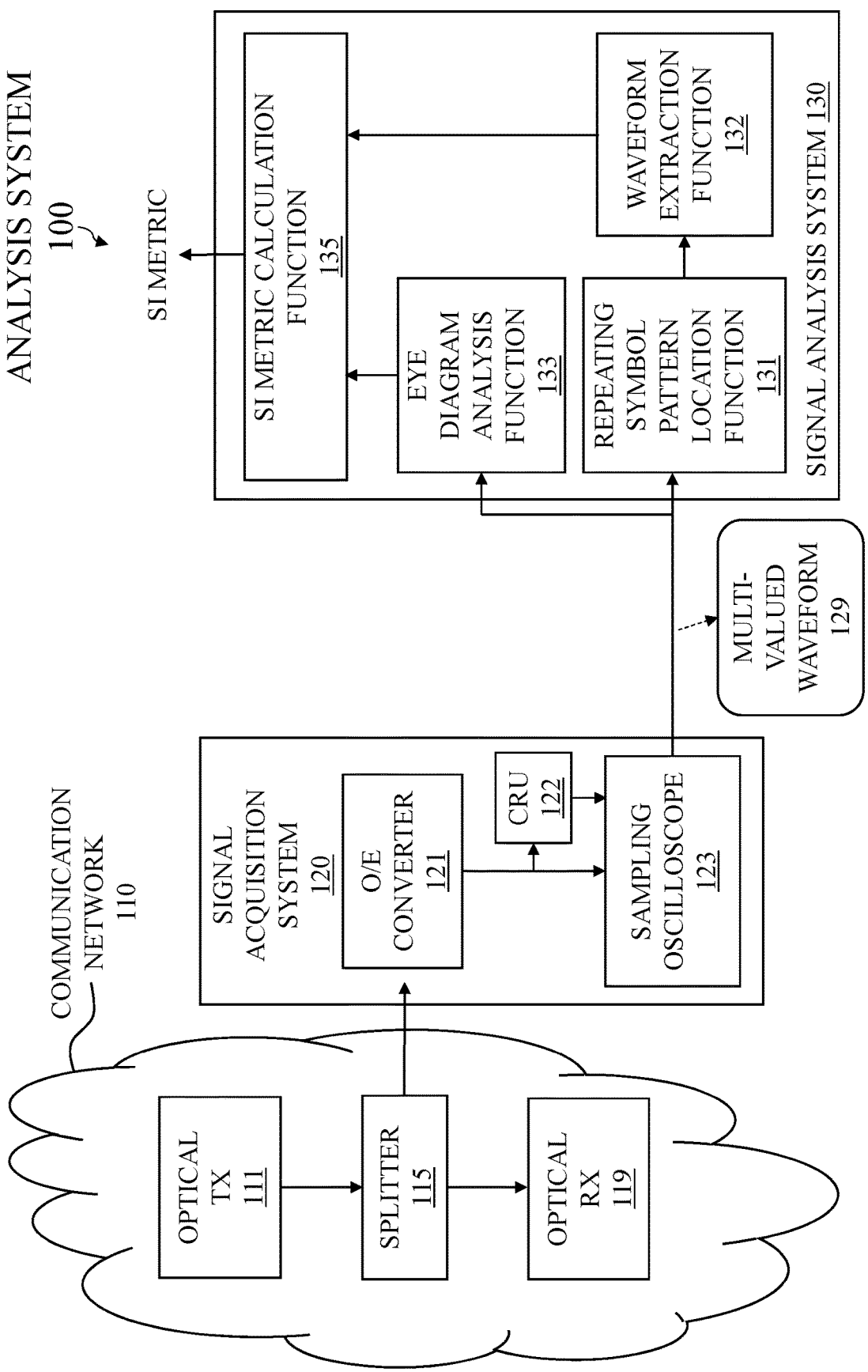
FIG. 1 depicts an example embodiment of a signal integrity analysis system configured to support signal analysis for signals of a communication network.

Various example embodiments of a signal analysis capability are presented herein. The signal analysis capability may be configured to support analysis of a signal for determining the signal integrity of the signal, where the signal integrity of the signal corresponds to a set of one or more measures of the quality of the signal (e.g., one or more signal integrity metrics indicative of the signal quality of the signal). The signal analysis capability may be configured to support analysis of a signal for determining the signal integrity of the signal for various types of signals which may be communicated within various types of communication networks (e.g., optical signals, electrical signals, or the like). The signal analysis capability may be configured to support analysis of a signal for determining the signal integrity of the signal where the signal may include various types of data traffic (e.g., live data traffic, user data traffic, test data traffic, or the like). The signal analysis capability may be configured to support analysis of a signal for determining a signal integrity metric indicative of the signal integrity of the signal. The signal analysis capability may be configured to support analysis of a signal for determining the integrity of the signal for various purposes, such as for equalization (e.g., in which case the signal integrity metric may be an equalization-based signal integrity metric) or for other signal integrity purposes. It will be appreciated that these example embodiments, as well as various other example embodiments, may be further understood by considering various example embodiments within the context of a particular type of communication network, such as a passive optical network (PON).

Various example embodiments of the signal analysis capability are configured to support signal analysis for signals communicated with a PON system, such as a PON system based on one or more of gigabit PON (GPON), Ethernet PON (EPON), or the like. The signal analysis capability may be configured to support analysis of a signal in a PON based on one or more of the International Telecommunication Union-Telecommunications Standardization Sector (ITU-T) standards for PONs (e.g., the G.987 recommendation (for 10G PON, which also is known as XG-PON), the G.9804 recommendation (for 50G PON, which also is known as Higher Speed PON), the newly proposed recommendation (e.g., Very High Speed PON (VHSP), expected to have a throughput goal of 100+ Gbps), or the like, as well as various combinations thereof). The signal analysis capability may be configured to support determination of one or more signal integrity metrics of a signal obtained from a PON where the one or more signal integrity metrics require signal equalization (e.g., one or more of an eye/eye-mask test after equalization (EYE-EQ) metric, a transmitter dispersion eye closure after equalization (TDEC-EQ) metric, a transmitter dispersion eye closure quaternary after equalization (TDECQ-EQ) metric, or the like, as well as various combinations thereof) or other types of processing which may be performed on a proper waveform that is a representation of a signal trajectory using time-ordered samples such that reasonably accurate reconstruction of the signal is possible. It will be appreciated that these example embodiments, as well as various other example embodiments, may be further understood by considering various example embodiments within the context of a PON system using a particular element for extraction of signals to be analyzed, such as a sampling oscilloscope in a PON system.

Various example embodiments of the signal analysis capability are configured to support signal analysis for signals recorded by a sampling oscilloscope within a communication system such as a PON system. The signal analysis capability may be configured to support signal analysis for signals recovered by a sampling oscilloscope where the signal analysis is performed for data traffic based on signal integrity metrics that are based on waveforms, such as EYE-EQ or TDEC-EQ, thereby enabling signal integrity testing to be performed based on data traffic (e.g., based on normal operation of a communication network, and which may include live data traffic, test data traffic, or the like), rather than only based on periodic test patterns (the use of which may be undesirable or even unavailable) in which case no multi-valued waveform is created. The signal analysis capability may be configured to support signal analysis for signals recovered by a sampling oscilloscope, where the signal analysis is performed for data traffic based on signal integrity metrics that are based on waveforms, by supporting waveform recording from signals including the data traffic. The signal analysis capability may be configured to support signal analysis for data traffic based on signal integrity metrics that are based on waveforms, by supporting waveform recording from signals including the data traffic, by leveraging availability of protocols supporting fixed-size protocol frames with repeating symbol patterns in order to locate positions of repeating symbol patterns within the signals and use the positions of the repeating symbol patterns within the signals to extract waveforms from the signals that may be used for calculating signal integrity metrics for the signals. It will be appreciated that these example embodiments, as well as various other example embodiments, may be further understood by considering various aspects PON communication systems and use of oscilloscopes to support signal analysis in such PON communication systems.

Regarding signal integrity and equalization in PON systems, it is noted that the ITU-T PON generations before 50G did not require any type of equalization. Rather, in order to evaluate transceiver compliance, earlier PON generations simply performed eye mask testing and bit error rate (BER) measurements as methods for optical transmitter signal integrity measurements. Here, parameters of interest typically included: extinction ratio, eye mask violations, jitter, dispersion penalty, and so forth. ITU-T 50G PON (G.9804.3) uses receiver side equalization and, therefore, introduced new measurement methods which are known as EYE-EQ in back-to-back and TDEC-EQ after fiber to better estimate transmitter signal integrity. These procedures require an equalizer to be applied to the received signal waveform and subsequent evaluation of the TDEC histogram across the resulting eye diagram, which measures susceptibility to further degradation by noise. Equalization, however, generally must be performed on a time domain waveform (e.g., a signal having consecutive samples in time domain recorded with a known, usually constant, time interval between sampling points, ideally providing at least two samples per symbol) and generally cannot be done on an eye diagram (which is a superposition of all states of the waveform where time relationship between individual points is lost).

Regarding signal integrity and equalization in PON systems, it is further noted that waveforms can be recorded by either real-time oscilloscopes (RTO), or equivalent-time oscilloscopes, often called sampling oscilloscopes, triggered by a clock recovery circuit (CR) and/or or a sub-rate trigger originating from the transmitter. Since signal integrity testing historically relied on only the eye diagram, various device/module vendors as well as operators commonly adopted sampling oscilloscopes (which was a far less expensive solution anyway). In order to perform computation of a metric such as EYE-EQ or TDEC-EQ, which requires a waveform, sampling oscilloscopes require periodic data patterns. During the waveform recording process, the sampling oscilloscope gradually fills gaps in a periodic waveform on each pattern repetition by shifting its sampling point such that the original waveform can be reconstructed; however, when operating with data traffic (e.g. such as PON data traffic), conventional analysis using periodic test patterns is not possible. Various example embodiments of the signal analysis capability as presented herein may be configured to enable signal integrity analysis with data traffic with fixed-length protocol framing including repetitive sections (e.g., such as ITU-T PON framing).

Regarding signal integrity and equalization in PON systems, it is further noted that, due to the presence of forward error correction and equalization in modern intensity modulation and direct detection (IM/DD) systems, the traditional eye/eye-mask measurements became largely obsolete. In order to better predict power penalty for receivers equipped with these functionalities, new metrics (e.g., EYE-EQ. TDEC-EQ for PAM2 (NRZ), TDECQ for PAM4, and so forth) have been proposed. Moreover, to better estimate power penalty on receivers with equalization functionality, measurement procedures for TDEC-EQ/TDECQ-EQ include waveform equalization using a virtual receiver prior to metric calculation. As discussed above, it is the equalization step that requires knowledge of the waveform (i.e., a signal having consecutive samples in the time domain), as opposed to the eye diagram (i.e., superposition of all states of the waveform where the time relationship between the samples is lost). As also discussed above, one of the instruments commonly used to perform signal integrity measurements is a sampling oscilloscope. Sampling oscilloscopes are often equipped with features such as "pattern lock" or "eyeline display mode" that allow for waveform recording of repetitive patterns. This, in turn, allows for waveform processing (e.g., equalization) and, thus, SI metric computation (e.g., EYE-EQ. TDEC-EQ, and so forth).

Various example embodiments of the signal analysis capability are configured to support signal analysis for signals recovered by a sampling oscilloscope within a communication system. The signal analysis capability may be configured to support signal analysis for signals recovered by a sampling oscilloscope where the signal analysis is performed for data traffic based on signal integrity metrics that are based on waveforms, such as EYE-EQ or TDEC-EQ, thereby enabling signal integrity testing to be performed based on traffic data rather than based on periodic test patterns (the use of which may be undesirable or even unavailable). The signal analysis capability may be configured to support signal analysis for signals recovered by a sampling oscilloscope, where the signals include data traffic, by leveraging availability of protocols supporting fixed-sized protocol frames with repeating symbol patterns in order to locate positions of repeating symbol patterns within multi-valued waveforms recorded based on the signals and use the positions of the repeating symbol patterns within the multi-valued waveforms to extract proper waveforms from the multi-valued waveforms that may be used for calculating signal integrity metrics for the signals. It will be appreciated that these example embodiments, as well as various other example embodiments, may be further understood by considering a signal integrity analysis system configured to support signal integrity analysis for signals of a communication network as presented with respect to FIG. 1.

FIG. 1 depicts an example embodiment of a signal integrity analysis system configured to support signal integrity analysis for signals of a communication network.

The signal integrity analysis system 100 is configured to support signal analysis for signals including data traffic in a communication network. The signal integrity analysis system 100 includes a communication network 110, a signal acquisition system 120, and a signal analysis system 130. The communication network 110 supports communication of data traffic (which, in the example of FIG. 1 as discussed further below, is PON data traffic communicated within a PON system). The signal acquisition system 120 is configured to extract signals from the communication network 110 and provide the extracted signals to the signal analysis system 130. The signal analysis system 130 is configured to receive the extracted signals and perform signal analysis for the extracted signals.

The signal integrity analysis system 100 is configured to support signal analysis for signals from the communication network 110. The signal integrity analysis system 100 is configured to support signal analysis for signals from the communication network 110 that include data traffic (e.g., live data traffic, user data traffic, test data traffic, or the like). The signal integrity analysis system 100 is configured to support signal analysis for signals including data traffic where the signals are based on a protocol that uses fixed-size protocol frames. The signal integrity analysis system 100 is configured support signal analysis for a signal that includes protocol frames of a protocol by leveraging repeating patterns of symbols in the protocol frames for location and extraction of waveforms which may be used to support the signal analysis for the signal. It will be appreciated that various protocols may have fixed-size protocol frames which may include repeating patterns of symbols which may be leveraged for supporting signal analysis for a signal including the protocol frames (e.g., in certain PON systems, as discussed further below, both downstream frames and upstream frames may support one or more repeating sets of symbols which may be leveraged for supporting signal analysis).

For example, in a PON system for the downstream direction, the signal integrity analysis system 100 may be configured to leverage repeating symbol patterns which occur in each of the physical downstream PON frames. The user data bit sequence sent downstream in an ITU-T PON frame (also called superframe) having a duration of 125 μs is scrambled using a pseudorandom scrambler (a 58-bit scrambler seeded with a 51-bit superframe counter which gives a repetition period of several thousands of years) yielding downstream data. It is noted that, while even if the user data were forced to be a fixed pattern, the scrambling operation would generate a transmitted bit sequence that is aperiodic during typical measurement durations, the downstream physical synchronization block (PSBd) field of the physical downstream PON frame is an exception since this PSBd field is always scrambled using a fixed pattern, occurs once in a 125-μs-long ITU-T PON frame at a fixed position, and includes three different bit fields which are mostly fixed: the PSync field, the superframe counter (SFC) structure, and the operation control (OC) structure (which is referred to as the PON-ID structure in previous standards). The PSync field is always 0xC5E51840FD59BB49 as per ITU-T PON recommendations, and is unscrambled (equivalently, always scrambled with 0x0000000000000000). The SFC structure, whose significant bits change slowly enough that many of them could be assumed constant during the measurement (at 50 Gbit/s, the most significant bit (MSB) of the SFC toggles every several thousand years), is always scrambled with 0x0F0F0F0F0F0F0F0F. The OC structure, a large portion of which remains fixed within the same PON, is always scrambled with 0x0F0F0F0F0F0F0F0F. It is noted that one or more of these fields may be leveraged to extract one or more corresponding waveforms which may be used for signal analysis of the signal, which includes the user data bit sequence, sent downstream in the ITU-T PON. It will be appreciated that this may be further understood by way of reference to FIG. 2 and FIG. 3.

For example, in a PON system for the upstream direction, the signal integrity analysis system 100 may be configured to leverage repeating symbol patterns which occur in each of the upstream PON burst frames. For example, a PON system may be configured such that, during the measurement, there exists at least one upstream burst allocation at a fixed position in the upstream frame assigned to the ONU whose signal is to be analyzed, and the same preamble and delimiter are used throughout the measurement such that the preamble and the delimiter can be used for waveform extraction. It will be appreciated that this may be further understood by way of reference to FIG. 2.

It will be appreciated that, although primarily discussed above with respect to examples based on frames in PON systems, signal analysis may be supported for signals including data traffic based on various other protocols which may be used within PON systems, based on various other protocols which may be used in PON systems and/or other communication systems, based on various other protocols which may be used in various other types of communication systems, and so forth.

It will be appreciated that the manner in which the signal acquisition system 120 and the signal analysis system 130 cooperate to support signal analysis for signals from the communication network 110 that include data traffic may be further understood by further considering each of the communication network 110, the signal acquisition system 120, and the signal analysis system 130, as discussed further below.

The communication network 110 is configured to support communication of data traffic, such as PON data traffic (e.g., PON data traffic between an optical line terminal (OLT) and an optical network unit (ONU) in a PON system based on a PON standard). The communication network 110 is configured to support communication of signals according to a protocol that supports a repeating fixed-size frame format, such as a PON frame format based on a PON standard. The communication network 110 includes an optical transmitter 111 and an optical receiver 119. The optical transmitter 111 transmits optical signals including the data traffic to the optical receiver 119. The communication network 110 also includes an optical splitter 115 arranged in the optical path between the optical transmitter 111 and the optical receiver 119. The optical splitter 115 is configured to receive, from the optical transmitter 111 via one or more optical fibers, the optical signals including the data traffic. The optical splitter 115 is configured to split the optical signal including the data traffic so that the optical signal including the data traffic can be provided to both the optical receiver 119 via one or more optical fibers and to the signal acquisition system 120 via one or more optical fibers. It will be appreciated that the communication network 110 may include various other elements which may support propagation of signals including data traffic.

The signal acquisition system 120 is configured to extract signals including data traffic from the communication network 110 and produce recorded signals that are analyzed by the signal analysis system 130 to determine signal integrity of the signals from the communication network 110 that include the data traffic. The signal acquisition system 120 is configured to record the signal including the data traffic to produce a recorded signal of the data traffic and provide the recorded signal of the data traffic to the signal analysis system 130 for analysis by the signal analysis system 130 to determine signal integrity of the signals from the communication network 110 that include the data traffic.

The signal acquisition system 120 is configured to record the signal including the data traffic as if the signal including the data traffic is a periodic pattern of protocol frames of the protocol being used for the signal including the data traffic, assuming that the pattern period of the periodic pattern of protocol frames is equal to the fixed size of the protocol framing structure of the protocol frames including the data traffic (e.g., assuming that the pattern period is equal to the number of symbols or bits in an integer multiple (e.g., one or more) of the fixed protocol framing structure length).

The signal acquisition system 120 is configured to record the signal including the data traffic to produce the recorded signal of the data traffic by aligning multiple protocol frames of the protocol and recording the aligned multiple protocol frames to produce the recorded signal of the data traffic. It will be appreciated that recording and averaging of multiple aligned protocol frames of the protocol can provide improved prominence of the repeating symbol pattern, i.e., use of an increasing number of recordings can provide increasing prominence of the repeating symbol pattern (where prominence may be based, for example, on the signal-to-noise ratio of the repeating symbol pattern).

The signal acquisition system 120 is configured to record the signal including the data traffic to produce the recorded signal of the data traffic by aligning multiple protocol frames of the protocol based on characteristics of the protocol frames of the protocol. For example, in a PON system, the signal acquisition system 120 may record the signal including the data traffic based on alignment and recording of multiple PON frames of the PON system. For example, in a PON system using downstream physical PON frames based on a downstream physical PON frame format, the signal acquisition system 120 may record the signal including the data traffic based on alignment and recording of multiple downstream physical PON frames of the PON system (e.g., aligning the 125 microsecond downstream physical PON frames with a pattern period of 125 microseconds).

The signal acquisition system 120 includes an optical-to-electrical (O/E) converter 121, a clock recovery unit (CRU) 122, and a sampling oscilloscope 123 (or a portion of a sampling oscilloscope, such as a hardware portion of a sampling oscilloscope). The O/E converter 113 is configured to receive, from the splitter 115 of the communication network 110, the optical signals from the communication network 110 that include the data traffic and convert the optical signals into electrical signals which are provided to the sampling oscilloscope 123. The CRU 122 is configured to receive the electrical signals from the O/E converter 121, perform clock recovery based on the electrical signals to produce clock recovery information configured for use in aligning the protocol frames in time, and provide the clock recovery information to the sampling oscilloscope 123. The sampling oscilloscope 123 is configured to receive the electrical signals from the O/E converter 121 and the clock recovery information from the CRU 122, record the signal including the data traffic as if it was a periodic pattern of protocol frames, and provide the recorded signal of the data traffic to the signal analysis system 130 for analysis by the signal analysis system 130. The recorded signal of the data traffic may be provided to the signal analysis system 130 in the form of a multi-valued waveform (illustratively, multi-valued waveform 129) recorded from the signal including the data traffic. It will be appreciated that the creation of the multi-valued waveform 129 from the signal including the data traffic may be further understood by way of reference to FIG. 2 and FIG. 3.

It will be appreciated that the signal acquisition system 120 may include various other elements which may produce signals which may be used by the signal analysis system 130 to determine signal integrity of the signals from the communication network 110 that include data traffic.

The signal analysis system 130 is configured to receive the recorded signal of the data traffic that is recorded from the received signal including the data traffic and perform signal analysis for the received signal including the data traffic based on analysis of the recorded signal of the data traffic. As indicated above, the recorded signal of the data traffic may be received from the signal acquisition system 120 in the form of a multi-valued waveform (illustratively, multi-valued waveform 129) recorded from the received signal including the data traffic. The signal analysis system 130 is configured to calculate a signal integrity metric for the received signal including the data traffic. The signal analysis system 130 is configured to locate, within a multi-valued waveform that is recorded based on the a received signal including multiple protocol frames that are based on a protocol, a position of a repeating symbol pattern that repeats across the multiple protocol frames, extract, from the multi-valued waveform based on the position of the repeating symbol pattern that repeats across the multiple protocol frames, a waveform of the repeating symbol pattern, and calculate a signal integrity metric for the received signal including the data traffic based on the waveform of the repeating symbol pattern. The signal analysis system 130 also may be configured to determine an eye diagram of the received signal including the data traffic (based on a multi-valued waveform that is recorded based on a received signal including multiple protocol frames that are based on a protocol) and calculate a signal integrity metric for the received signal based on the waveform of the repeating symbol pattern and the eye diagram of the received signal including the data traffic. The signal analysis system 130 may be configured to calculate various signal integrity metrics which may be based on waveforms, such as one or more of an EYE-EQ metric, a TDEC-EQ metric, a TDECQ-EQ metric, or the like, as well as various combinations thereof.

The signal analysis system 130, as discussed further below, may be implemented in various ways for the performing signal analysis for the received signals including the data traffic, based on the recorded signals recorded from the received signals including the data traffic by the signal acquisition system 120, in order to calculate signal integrity metrics for the received signals including the data traffic. For example, as illustrated in FIG. 1, the signal analysis system 130 may include a repeating symbol pattern location function 131, a waveform extraction function 132, an eye diagram analysis function 133, and a signal integrity metric calculation function 135. It will be appreciated that the signal analysis system 130 may include fewer or more, as well as different, elements configured to support signal analysis for the received signals including data traffic in order to calculate signal integrity metrics for the received signals including data traffic.

The repeating symbol pattern location function 131 is configured to locate, within a multi-valued waveform recorded based on a received signal including multiple protocol frames that are based on a protocol (e.g., based on the multi-valued waveform 129), a position of a repeating symbol pattern that repeats across the multiple protocol frames. The repeating symbol pattern location function 131, as discussed further below, may locate (or determine) the position of the repeating symbol pattern in different ways depending on whether the repeating symbol pattern location function 131 has a priori knowledge of the repeating symbol pattern.

The repeating symbol pattern location function 131, when the repeating symbol pattern is known, may determine the position of the repeating symbol pattern in various ways. The repeating symbol pattern location function 131, when the repeating symbol pattern is known, may determine the position of the repeating symbol pattern using cross-correlation or convolution with a known symbol pattern (e.g., the location of the repeating symbol pattern and the known symbol pattern may be determined relative to each other based on knowledge regarding the protocol frame structure of the protocol). The repeating symbol pattern location function 131 may determine the position of the repeating symbol pattern using cross-correlation or convolution with the known symbol pattern where the cross-correlation or convolution may be applied directly or after appropriate upsampling and/or filtering is applied to the known symbol pattern. For example, in a PON system using downstream physical PON frames based on a downstream physical PON frame format that includes a downstream physical synchronization block (PSBd), knowledge of the PSync field may be used to determine the location of the SFC structure of the PSBd or the location of at least a portion of an OC structure of the PBSd. For example, in a PON system using an upstream PON burst structure, knowledge of the burst preamble may be used to determine the location of the delimiter.

The repeating symbol pattern location function 131, when the repeating symbol pattern is unknown, may determine the position of the repeating symbol pattern in various ways. The repeating symbol pattern location function 131, when the repeating symbol pattern is unknown, may determine the position of the repeating symbol pattern based on matched filtering (convolution with the transmitter pulse shape) and subsequent threshold qualification.

It will be appreciated that the repeating symbol pattern location function 131 may determine the position of the repeating symbol pattern using various other methods (e.g., one or more other methods for determining the position of the repeating symbol pattern when the repeating symbol pattern is known, one or more other methods for determining the position of the repeating symbol pattern when the repeating symbol pattern is unknown, or the like, as well as various combinations thereof).

It will be appreciated that, although primarily presented with respect to locating a position of a single repeating symbol pattern, respective positions of multiple repeating symbol patterns may be identified (and used for extracting respective waveforms which may be used for calculating the signal integrity metric).

Figure 3:
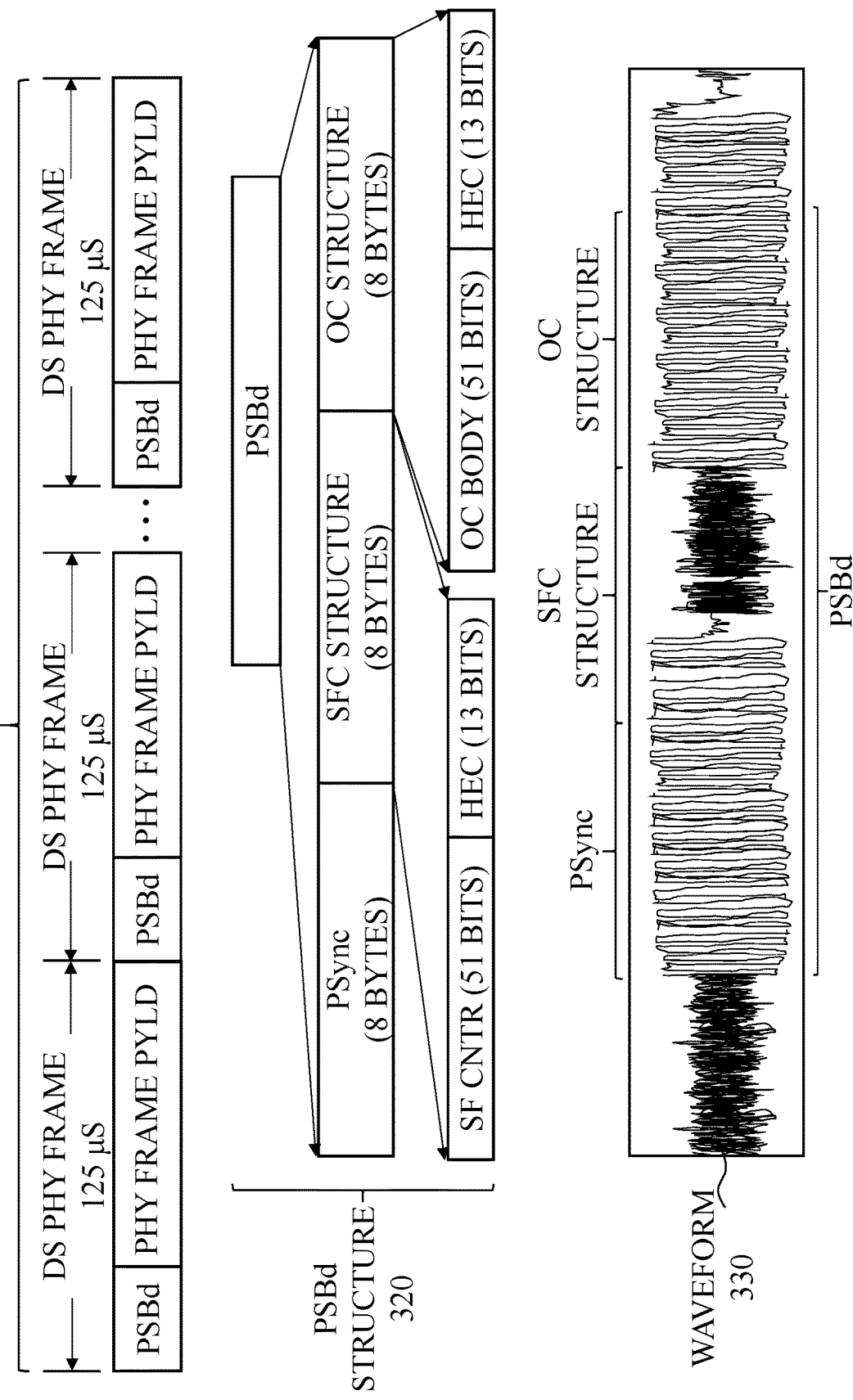
FIG. 3 depicts an example embodiment for location and extraction of waveforms for repeating symbol patterns in downstream physical frames based on a passive optical networking protocol.

It will be appreciated that a position of a repeating symbol pattern that repeats across multiple protocol frames of a received signal may be further understood by way of reference to FIG. 2 and FIG. 3.

The waveform extraction function 132 is configured to extract, from the received signal based on the position of the repeating symbol pattern that repeats across the multiple protocol frames, a waveform of the repeating symbol pattern. For example, in a PON system using downstream physical PON frames based on a downstream physical PON frame format that includes a downstream physical synchronization block (PSBd), the waveform may correspond to a repeating symbol pattern of the PSync field, a repeating symbol pattern of the structure, or a repeating symbol pattern corresponding to at least a portion of an SFC structure. For example, in a PON system using an upstream PON burst structure, the waveform may correspond to a repeating symbol pattern of the burst preamble or a repeating symbol pattern of the delimiter.

The waveform extraction function 132 may be configured to provide the waveform of the repeating symbol pattern to the signal integrity metric calculation function 135 for use by the signal integrity metric calculation function 135 to calculate the signal integrity metric of the received signal.

It will be appreciated that, although primarily presented with respect to extracting a waveform for a single repeating symbol pattern, respective waveforms of multiple repeating symbol patterns may be extracted (and used for calculating the signal integrity metric).

It will be appreciated that the extraction of the waveform of the repeating symbol pattern that repeats across multiple protocol frames of a received signal may be further understood by way of reference to FIG. 2 and FIG. 3.

The eye diagram analysis function 133 is configured to determine an eye diagram of the received signal including the data traffic. The eye diagram analysis function 133 is configured to determine an eye diagram of the received signal including the data traffic based on use of the recorded signal of the data traffic which is received from the signal acquisition system 120 in the form of a multi-valued waveform (illustratively, the multi-valued waveform 129). The eye diagram analysis function 133 may be configured to provide the eye diagram of the received signal to the signal integrity metric calculation function 135 for use by the signal integrity metric calculation function 135 to calculate the signal integrity metric of the received signal. It will be appreciated that, while use of the eye diagram is optional, a joint analysis of the waveform of the repeating symbol pattern and the eye diagram may provide improved accuracy of the signal integrity metric that is calculated (e.g., where the eye diagram may account for possible underrepresentation of waveform states in the recorded waveform of the repeating symbol pattern).

The signal integrity metric calculation function 135 is configured to calculate, based on the waveform of the repeating symbol pattern and optionally based on the eye diagram of the received signal including the data traffic, a signal integrity metric of the received signal including the data traffic. The signal integrity metric calculation function 135 may calculate the signal integrity metric of the received signal including the data traffic in various ways, some of which are presented with respect to FIG. 4, FIG. 5, FIG. 6, and FIG. 7.

For example, the signal integrity metric calculation function 135 may calculate the signal integrity metric of the received signal including the data traffic using the waveform of the repeating symbol pattern from the waveform extraction function 132 (e.g., using the raw version of the waveform of the repeating symbol pattern, using a processed version of the waveform of the repeating symbol pattern that has been processed based on a signal processing capability, or the like, as well as various combinations thereof) and, optionally, using the eye diagram of the received signal from the eye diagram generation function 133 (e.g., using the raw version of the eye diagram of the received signal, using a processed version of the eye diagram of the received signal, or the like, as well as various combinations thereof. It will be appreciated that various combinations of such capabilities may be applied to calculate the signal integrity metric of the received signal.

For example, the signal integrity metric calculation function 135 may calculate the signal integrity metric of the received signal including the data traffic using various processing capabilities. For example, the signal integrity metric calculation function 135 may calculate the signal integrity metric of the received signal using signal processing capabilities configured to process the waveform of the repeating symbol pattern from the waveform extraction function 132 and the eye diagram of the received signal from the eye diagram generation function 133. For example, the signal integrity metric calculation function 135 may calculate the signal integrity metric of the received signal based on use of one or more signal integrity metric calculation functions (e.g., a signal integrity metric calculation function configured to calculate the signal integrity metric of the received signal, one or more signal integrity metric calculation functions which may be used to calculate intermediate signal integrity metrics which may be further processed to calculate the signal integrity metric of the received signal). For example, the signal integrity metric calculation function 135 may calculate the signal integrity metric of the received signal based on use of one or more signal integrity metric processing functions (e.g., one or more signal integrity metric processing functions configured to process one or more intermediate signal integrity metrics to calculate the signal integrity metric for the received signal. It will be appreciated that various combinations of such capabilities may be used in various combinations to calculate the signal integrity metric of the received signal.

For example, the signal integrity metric calculation function 135 may calculate the signal integrity metric of the received signal including the data traffic by performing a signal integrity metric computation on the waveform of the repeating symbol pattern to produce the signal integrity metric of the received signal. For example, the signal integrity metric calculation function 135 may calculate the signal integrity metric of the received signal by performing a signal integrity metric computation on the waveform of the repeating symbol pattern to produce an intermediate signal integrity metric and adapting the intermediate signal integrity metric (e.g., based on one or more of a processed version of the waveform of the repeating symbol pattern, the eye diagram of the received signal, a processed version of the eye diagram of the received signal, or the like, as well as various combinations thereof) to calculate the signal integrity metric of the received signal. For example, the signal integrity metric calculation function 135 may calculate the signal integrity metric of the received signal by performing a signal integrity metric computation on the waveform of the repeating symbol pattern to produce an intermediate signal integrity metric and adapting the intermediate signal integrity metric (e.g., based on one or more of a signal integrity metric calculated based on a processed version of the waveform of the repeating symbol pattern, a signal integrity metric calculated based on the eye diagram of the received signal, a signal integrity metric calculated based on a processed version of the eye diagram of the received signal, or the like, as well as various combinations thereof) to calculate the signal integrity metric of the received signal. It will be appreciated that various combinations of such capabilities may be applied to calculate the signal integrity metric of the received signal.

For example, the signal integrity metric calculation function 135 may calculate the signal integrity metric of the received signal including the data traffic by processing the waveform of the repeating symbol pattern to provide a processed waveform and then performing a signal integrity metric computation on the processed waveform to produce the signal integrity metric of the received signal. For example, the signal integrity metric calculation function 135 may calculate the signal integrity metric of the received signal by performing a signal integrity metric computation on the processed waveform to produce an intermediate signal integrity metric and adapting the intermediate signal integrity metric (e.g., based on one or more of a raw version of the waveform of the repeating symbol pattern, the eye diagram of the received signal, a processed version of the eye diagram of the received signal, or the like, as well as various combinations thereof) to calculate the signal integrity metric of the received signal. For example, the signal integrity metric calculation function 135 may calculate the signal integrity metric of the received signal by performing a signal integrity metric computation on the processed waveform to produce an intermediate signal integrity metric and adapting the intermediate signal integrity metric (e.g., based on one or more of a signal integrity metric calculated based on a raw version of the waveform of the repeating symbol pattern, a signal integrity metric calculated based on the eye diagram of the received signal, a signal integrity metric calculated based on a processed version of the eye diagram of the received signal, or the like, as well as various combinations thereof) to calculate the signal integrity metric of the received signal. It will be appreciated that various combinations of such capabilities may be applied to calculate the signal integrity metric of the received signal.

It will be appreciated that various combinations of such capabilities (e.g., inputs, intermediate signal integrity metrics, signal processing capabilities (e.g., waveform processing capabilities, eye diagram processing capabilities, or the like), signal integrity metric calculator capabilities, signal integrity metric processing capabilities, or the like, as well as various combinations thereof) may be applied in various ways to calculate the signal integrity metric of the received signal including the data traffic.

It will be appreciated that, where combinations of such capabilities are applied for calculating the signal integrity metric, the combinations may be applied in various ways, such as through use of correction factors (e.g., predetermined correction factors, dynamically determined correction factors, or the like), machine learning based on previously acquired training data sets, or the like, as well as various combinations thereof.

It will be appreciated that, although primarily described with respect to calculation of the signal integrity metric based on identification of a single repeating symbol pattern, the signal integrity metric may be calculated based on identification of multiple repeating symbol patterns.

It will be appreciated that the signal analysis system 130 may be implemented in various ways. In at least some example embodiments, for example, the signal analysis system 130 may be combined in various combinations on one or more elements (e.g., one or more physical elements (e.g., computers), one or more virtual elements (e.g., virtual machines), or the like, as well as various combinations thereof), distributed in various combinations across one or more sets of multiple elements, or the like, as well as various combinations thereof. In at least some example embodiments, for example, the signal analysis system 130 may be implemented within a sampling oscilloscope housing that also includes the oscilloscope hardware, within one or more physical elements (e.g., computers) external to the oscilloscope housing (e.g., one or more computers directly connected to the oscilloscope housing, one or more computers indirectly connected to the oscilloscope housing via one or more communication networks, or the like, as well as various combinations thereof), one or more virtual elements (e.g., virtual machines) running in one or more virtual environments (e.g., within one or more clouds), or the like, as well as various combinations thereof.

It will be appreciated that the signal integrity analysis system 100 may include various other elements which may cooperate to support signal integrity analysis for signals communicated via communication systems.

FIG. 2 depicts an example embodiment for location and extraction of waveforms for repeating symbol patterns in protocol frames of a protocol. As depicted in FIG. 2, a pattern of fixed-size protocol frames 210 is received (illustratively, fixed-size protocol frames 210-1 to 210-N). The fixed-sized protocol frames 210 each include two repeating symbol patterns 211 at particular locations within the fixed-size protocol frames, respectively (illustratively, first repeating symbol pattern 211-1 at a first location within each of the fixed-size protocol frames 210 and a second repeating symbol pattern 211-2 at a second location within each of the fixed-size protocol frames 210). The fixed-size protocol frames 210 are processed by a sampling oscilloscope (omitted for purposes of clarity), which is pattern locked to the fixed-size protocol frames 210 based on boundaries of the fixed-size protocol frames 210, to produce a multi-valued waveform 220 corresponding to the frame duration of the fixed-size protocol frames 210. The multi-valued waveform 220, as indicated by the name, will be understood to be a multi-valued waveform, as opposed to a proper waveform. The multi-valued waveform 220 includes three sections 221-1 to 221-3 which correspond to non-repeating portions of the fixed-size protocol frames 210 and two sections 222-1 to 222-2 which corresponding to repeating portions of the fixed-size protocol frames 210. The three sections 221-1 to 221-3 which correspond to non-repeating portions of the fixed-size protocol frames 210, given that the symbol patterns of these sections are not repeating, will be a multi-valued waveform or ultimately may include samples distributed according to a statistical distribution (e.g., a single-modal or multi-modal normal distribution). The positions of the two sections 222-1 and 222-2 which correspond to repeating portions of the fixed-size protocol frames 210 (namely, the sections 222-1 and 222-2 of the multi-valued waveform 220) within the multi-valued waveform 220 are located and extracted as a first waveform 223-1 of repeating symbol patterns (corresponding to the section 222-1) and a second waveform 223-2 of repeating symbol patterns (corresponding to the section 222-2), respectively (where the waveform 223-1 and the waveform 223-2 may be referred to collectively as waveforms 223 of the sixed-size protocol frames 210). The waveforms 223 will be understood to be proper waveforms (where a proper waveform is a representation of a signal trajectory using time-ordered samples, which allows for reasonably accurate reconstruction of the signal trajectory) suitable for use for equalization or other purposes where knowledge of symbol pattern is necessary or desirable. The waveforms 223 are then available for use in performing signal integrity processing for the signal propagating the fixed-size protocol frames 210. It will be appreciated that, although primarily presented with respect to recording of a multi-valued waveform 220 that corresponds to the frame duration of the fixed-size protocol frames 210, a multi-valued waveform recorded from the fixed-size protocol frames 210 may correspond to an integer multiple of the frame duration of the fixed-size protocol frames 210. It will be appreciated that, although primarily presented with respect to identification and extraction of two waveforms based on two available sections of repeating symbol patterns being repeated across the protocol frames of the protocol, fewer or more waveforms may be identified and extracted from a pattern of protocol frames of the protocol.

FIG. 3 depicts an example embodiment for location and extraction of waveforms for repeating symbol patterns in downstream physical frames based on a passive optical networking protocol. As depicted in FIG. 2, a sequence of fixed-size protocol frames 310 is received in the form of a downstream physical frame sequence 310 including N number of ITU-T PON frames each having a fixed-size duration of 125 μs. The downstream physical frames in the downstream physical frame sequence 310 each include a PSBd field which, as discussed above, includes three repeating (or substantially repeating) symbol patterns which are repeated across the PSBd fields of the downstream physical frames. The PSBd field format 320 illustrates that the PSBd field is composed of a number of fields, including three fields with bit patterns that repeat (or substantially repeat) across the PSBd fields of the downstream physical frames: namely, the PSync field (which is always 0xC5E51840FD59BB49 as per ITU-T PON recommendations), the SFC structure whose significant bits change slowly enough that many of them could be assumed constant during the measurement, and the OC structure (which is remains fixed within the same PON). The downstream physical frames of the downstream physical frame sequence 310 are processed by a sampling oscilloscope (omitted for purposes of clarity), which is pattern locked to the 125 μs duration of the downstream physical PON frames, to produce a waveform 330 in which the non-repeating sections of the downstream physical frames are represented as multi-valued sections or ultimately may include samples distributed according to a statistical distribution (e.g., a single-modal or multi-modal normal distribution) and may even average to zero over enough frames and the repeating sections of the downstream physical frames (namely, the PSync, the SFC structure, and the OC structure) are represented, at least partly, by proper waveforms which may be processed for signal analysis purposes. It will be appreciated that, although primarily presented with respect to recording of the waveform 330 such that the waveform 330 corresponds to the frame duration of the downstream physical frames in the downstream physical frame sequence 310, a waveform recorded from the downstream physical frames in the downstream physical frame sequence 310 may be recorded such that the waveform correspond to an integer multiple of the frame duration of the downstream physical frames in the downstream physical frame sequence 310. It will be appreciated that, although primarily presented with respect to identification and extraction of two waveforms based on two available sections of repeating symbol patterns being repeated across the protocol frames of the protocol frame sequence, fewer or more waveforms may be identified and extracted from the protocol frames of the protocol frame sequence.

Figure 4:
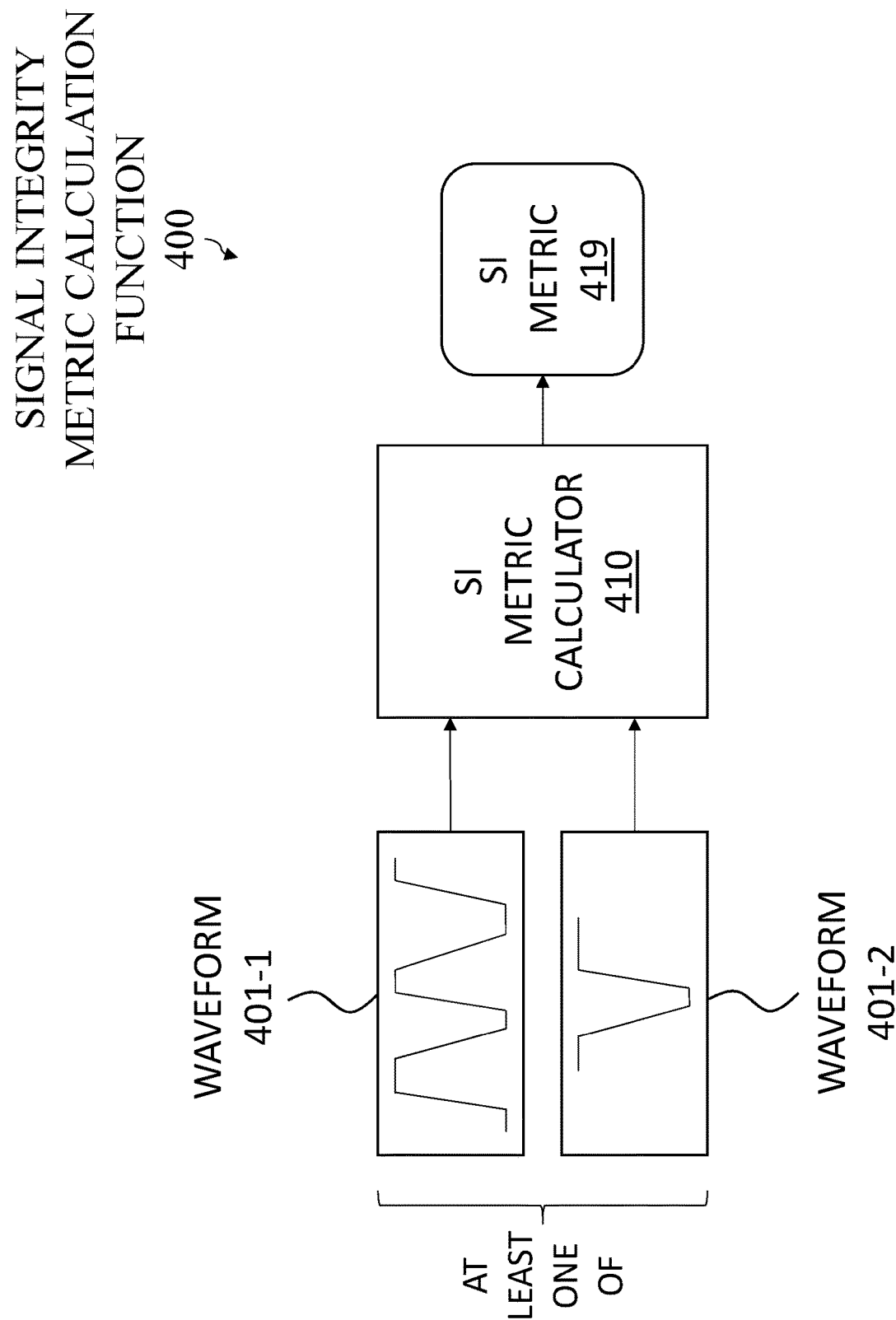
FIG. 4 depicts an example embodiment of a signal integrity metric calculation function configured to determine a signal integrity metric for a received signal.

FIG. 4 depicts an example embodiment of a signal integrity metric calculation function configured to determine a signal integrity metric for a received signal. The signal integrity metric calculation function 400 is configured to calculate a signal integrity metric for a received signal based on one or more waveforms 401 of repeating symbol patterns extracted from the received signal (illustratively, one or more of a first waveform 401-1 extracted for a first repeating symbol pattern and a second waveform 401-2 extracted for a second repeating symbol pattern). The signal integrity metric calculation function 400 is configured to operate on the one or more waveforms 401 of repeating symbol patterns directly without performing initial waveform processing. The signal integrity metric calculation function 400 includes a signal integrity metric calculator 410. The signal integrity metric calculator 410 receives the one or more waveforms 401 of repeating symbol patterns and calculates a signal integrity metric 419 (e.g., EYE-EQ, TDEC-EQ. TDECQ-EQ, or the like) based on the one or more of the waveforms 401 of repeating symbol patterns. It will be appreciated that the signal integrity metric calculation function 400 of FIG. 4 may be used as the signal integrity metric calculation function 135 of the signal analysis system 130 of FIG. 1, or in various other contexts, for supporting calculation of one or more signal integrity metrics for various types of data traffic (e.g., live data traffic, user data traffic, test data traffic, or the like).

FIG. 5 depicts an example embodiment of a signal integrity metric calculation function configured to determine a signal integrity metric for a received signal. The signal integrity metric calculation function 500 is configured to calculate a signal integrity metric for a received signal based on one or more waveforms 501 of repeating symbol patterns extracted from the received signal (illustratively, one or more of a first waveform 501-1 extracted for a first repeating symbol pattern and a second waveform 501-2 extracted for a second repeating symbol pattern). The signal integrity metric calculation function 500 is configured to operate on the one or more waveforms 501 of repeating symbol patterns while also performing initial waveform processing prior to calculating the signal integrity metric. The signal integrity metric calculation function 500 includes a waveform processor 510 and a signal integrity metric calculator 520. The waveform processor 510 performs waveform processing on the one or more waveforms 501 to produce one or more processed waveforms which are input to the signal integrity metric calculator 520. The signal integrity metric calculator 520 receives the one or more processed waveforms produced based on the one or more waveforms 501 of repeating symbol patterns and calculates a signal integrity metric 529 based on the processed waveforms produced based on the one or more waveforms 501 of repeating symbol patterns. It will be appreciated that the signal integrity metric calculation function 500 of FIG. 5 may be used as the signal integrity metric calculation function 135 of the signal analysis system 130 of FIG. 1, or in various other contexts, for supporting calculation of one or more signal integrity metrics for various types of data traffic (e.g., live data traffic, user data traffic, test data traffic, or the like).

Figure 6:
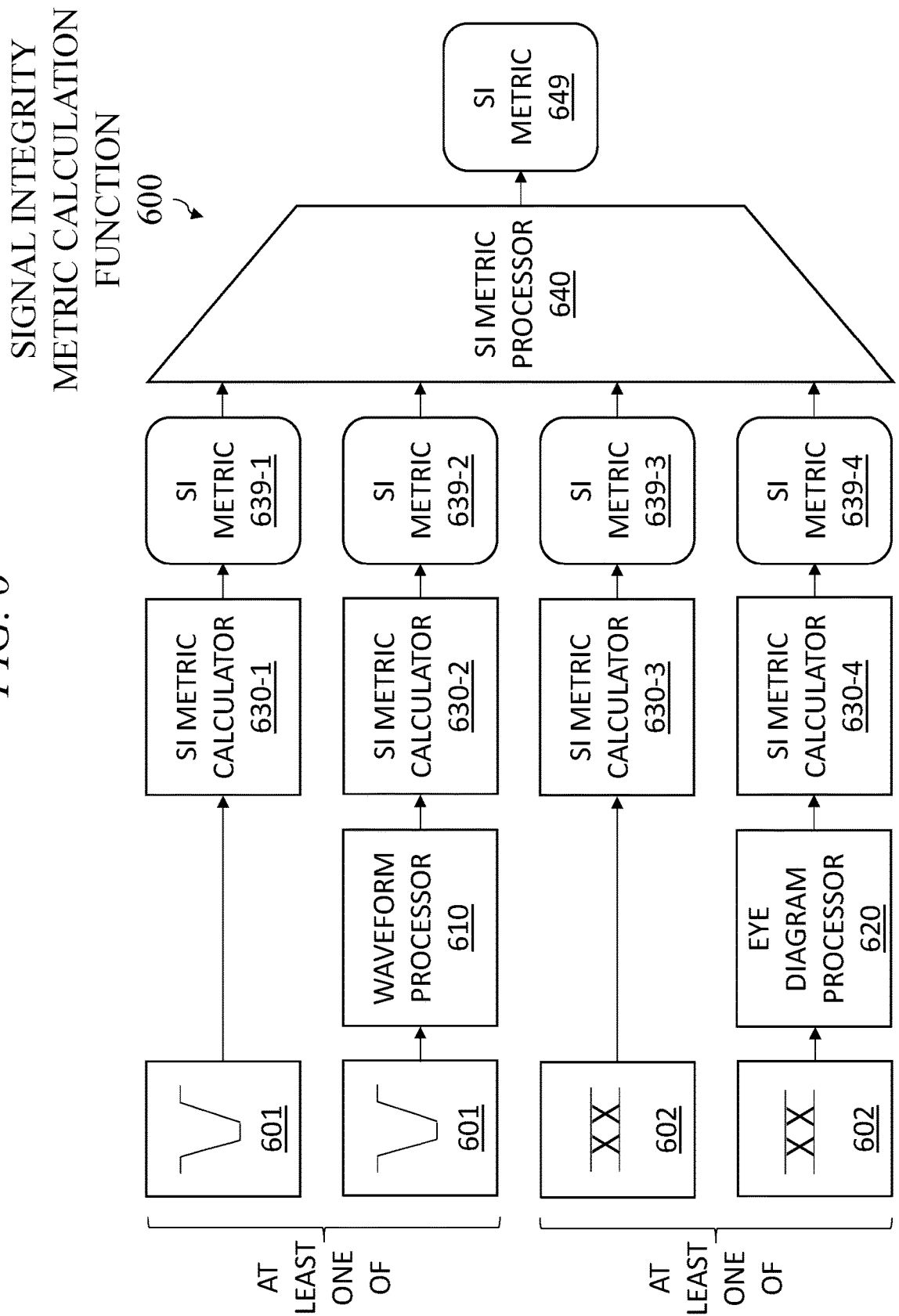
FIG. 6 depicts an example embodiment of a signal integrity metric calculation function configured to determine a signal integrity metric for a received signal.

FIG. 6 depicts an example embodiment of a signal integrity metric calculation function configured to determine a signal integrity metric for a received signal.

The signal integrity metric calculation function 600 is configured to calculate a signal integrity metric for a received signal. The signal integrity metric calculation function 600 is configured to calculate the signal integrity metric for the received signal based on a waveform 601 of repeating symbol patterns extracted from the received signal and based on an eye diagram 602 of the received signal. The signal integrity metric calculation function 600 is configured to calculate a signal integrity metric by calculating one or more initial signal integrity metrics based on the waveform 601 of repeating symbol patterns, calculating one or more additional signal integrity metrics based on the eye diagram 602, and then adapting the one or more initial signal integrity metrics based on the one or more additional signal integrity metrics.

The signal integrity metric calculation function 600 is configured to calculate the one or more initial signal integrity metrics. The calculation of the one or more initial signal integrity metrics based on the waveform 601 is illustrated with the top two rows of FIG. 6. The signal integrity metric calculation function 600 includes a first signal integrity metric calculator 630-1 that calculates a first signal integrity metric 639-1 based on the waveform 601 of repeating symbol patterns. The signal integrity metric calculation function 600 includes a waveform processor 610 and a second signal integrity metric calculator 630-2, where the waveform processor 610 performs waveform processing of the waveform 601 of repeating symbol patterns to produce a processed waveform and the second signal integrity metric calculator 630-2 calculates a second signal integrity metric 639-2 based on the processed waveform. The first signal integrity metric 639-1 and the second signal integrity metric 639-2 are the initial signal integrity metrics. It will be appreciated that, although primarily presented with respect to use of a single waveform 601 of repeating symbol patterns, multiple waveforms of repeating symbol patterns may be used for computing either or both of the one or more initial signal integrity metrics.

The signal integrity metric calculation function 600 is configured to calculate the one or more additional signal integrity metrics. The calculation of the one or more additional signal integrity metrics based on the eye diagram 602 is illustrated with the bottom two rows of FIG. 6. The signal integrity metric calculation function 600 includes a third signal integrity metric calculator 630-3 that calculates a third signal integrity metric 639-3 based on the eye diagram 602. The signal integrity metric calculation function 600 includes an eye diagram processor 620 and a fourth signal integrity metric calculator 630-4, where the eye diagram processor 620 performs signal processing on the eye diagram 602 to produce a processed waveform and the fourth signal integrity metric calculator 630-4 calculates a fourth signal integrity metric 639-4 based on the processed waveform. The third signal integrity metric 639-3 and the fourth signal integrity metric 639-4 are the additional signal integrity metrics.

The signal integrity metric calculation function 600 is configured to calculate the signal integrity metric of the received signal by adapting the one or more initial signal integrity metrics based on the additional signal integrity metrics. The signal integrity metric calculation function 600 includes a signal integrity metric processor 640 that is configured to receive each of the signal integrity metrics 639 and process the signal integrity metrics to produce the signal integrity metric 649. The signal integrity metric processor 640 is configured to adapt the first signal integrity metric 639-1 and/or the second signal integrity metric 639-2 based on the third signal integrity metric 639-3 and/or the fourth signal integrity metric 639-4 to produce the signal integrity metric 649. The signal integrity metric 649 is output by the signal integrity metric calculation function 600.

It will be appreciated that the signal integrity metric calculation function 600 of FIG. 6 may be used as the signal integrity metric calculation function 135 of the signal analysis system 130 of FIG. 1, or in various other contexts, for supporting calculation of one or more signal integrity metrics for various types of data traffic (e.g., live data traffic, user data traffic, test data traffic, or the like).

Figure 7:
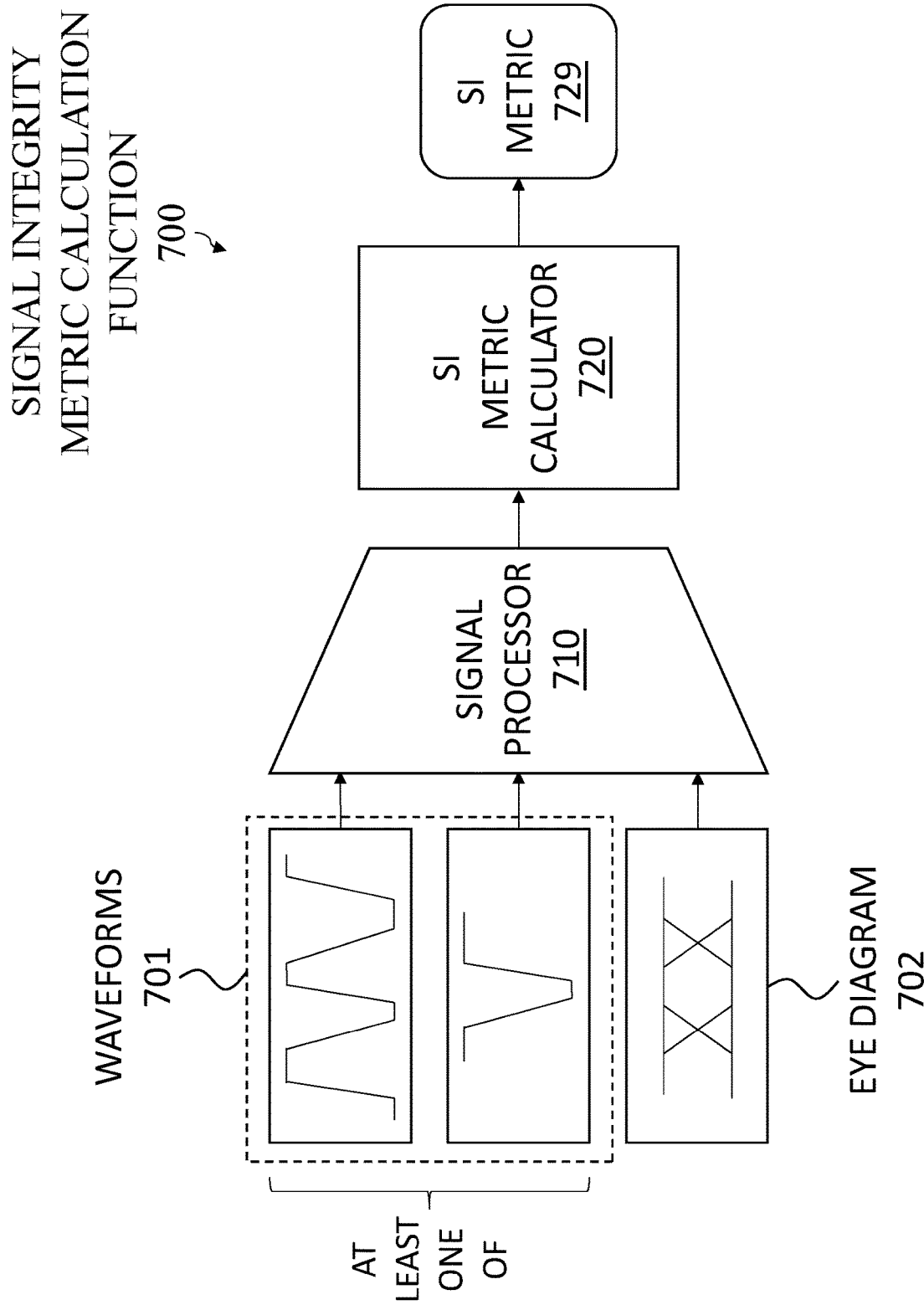
FIG. 7 depicts an example embodiment of a signal integrity metric calculation function configured to determine a signal integrity metric for a received signal.

FIG. 7 depicts an example embodiment of a signal integrity metric calculation function configured to determine a signal integrity metric for a received signal. The signal integrity metric calculation function 700 is configured to calculate a signal integrity metric for a received signal based on a combination of one or more waveforms 701 of repeating symbol patterns extracted from the received signal and an eye diagram 702 of the received signal. The signal integrity metric calculation function 700 is configured to perform signal processing on a combination of the one or more of the waveforms 701 of repeating symbol patterns and the eye diagram 702 prior to calculating the signal integrity metric. The signal integrity metric calculation function 700 includes a signal processor 710 and a signal integrity metric calculator 720. The signal processor 510 performs signal processing on a combination of one or more of the waveforms 701 of repeating symbol patterns and the eye diagram 702 to produce a signal processing output that is based on a combination of one or more of the waveforms 701 of repeating symbol patterns and the eye diagram 702. The signal integrity metric calculator 720 receives the signal processing output and calculates a signal integrity metric 729 based on the signal processing output. It will be appreciated that the signal integrity metric calculation function 700 of FIG. 7 may be used as the signal integrity metric calculation function 135 of the signal analysis system 130 of FIG. 1, or in various other contexts, for supporting calculation of one or more signal integrity metrics for various types of data traffic (e.g., live data traffic, user data traffic, test data traffic, or the like).

It will be appreciated that the example embodiments of FIG. 4, FIG. 5, FIG. 6, and FIG. 7 represent a few of the ways in which the waveform of the repeating symbol pattern and/or the eye diagram of the received signal may be used to determine the signal integrity metric for a received signal, and that various other combinations of the waveform of the repeating symbol pattern and/or the eye diagram of the received signal may be used to determine the signal integrity metric for a received signal.

Figure 8:
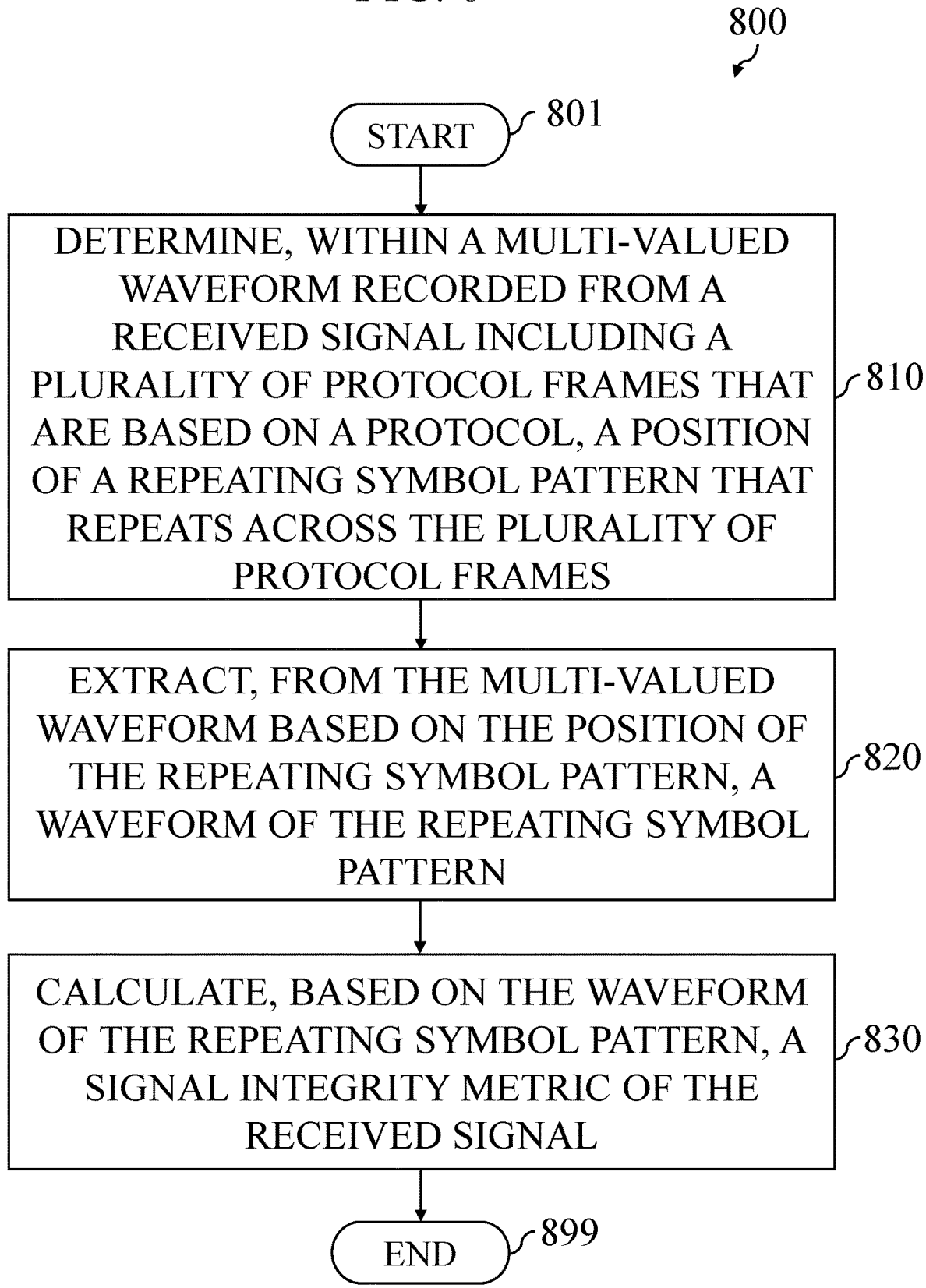
FIG. 8 depicts an example embodiment of a method configured to support determination of a signal integrity metric for a received signal.

FIG. 8 depicts an example embodiment of a method configured to support determination of a signal integrity metric for a received signal. It will be appreciated that, although primarily presented herein as being performed serially, at least a portion of the functions of method 800 may be performed contemporaneously or in a different order than as presented in FIG. 8. At block 801, the method 800 begins. At block 810, determine, within a multi-valued waveform recorded from a received signal including a plurality of protocol frames that are based on a protocol, a position of a repeating symbol pattern that repeats across the plurality of protocol frames. At block 820, extract, from the multi-valued waveform based on the position of the repeating symbol pattern, a waveform of the repeating symbol pattern. At block 830, calculate, based on the waveform of the repeating symbol pattern, a signal integrity metric of the received signal. At block 899, the method 800 ends.

Various example embodiments of a signal analysis capability may provide various advantages or potential advantages. For example, various example embodiments of a signal analysis capability may be configured to support use of sampling oscilloscopes for signal integrity analysis of signals including data traffic, which is advantageous as there is already an extensive hardware base of sampling oscilloscopes available with vendors and operators and, further, as compared with RTOs, sampling oscilloscopes generally have lower cost and simpler operation. For example, various example embodiments of a signal analysis capability may be configured to support signal analysis using signal integrity metrics based on waveforms using data traffic rather than using periodic test signals (e.g., Short Stress Pattern Random (SSPR), Short Stress Pattern Random Quaternary (SSPRQ), pseudorandom binary/quaternary sequences (PRBS/PRQS), or the like) which may be undesirable for various reasons (e.g., the use of test signals may require a built-in or external pattern generator which may not be available, may require access to low-level hardware interfaces which may not be desirable to be disclosed to end-users; (may require calibration steps that require non-trivial bidirectional data communication that may involve higher protocol layers, and periodic test patterns are an invasive technique which interrupts data traffic, and should be avoided for a system in operation). Various example embodiments of a signal analysis capability may provide various other advantages or potential advantages.

It will be appreciated that, although primarily presented herein within the context of use of various example embodiments of the signal analysis capability to determine signal integrity for particular types of signals which may be communicated within particular types of communication networks based on particular communication technologies, various example embodiments of the signal analysis capability may be configured to support analysis of a signal for determining the signal integrity of the signal for various types of signals which may be communicated in various types of communication networks (e.g. optical signals, electrical signals, or the like).

Figure 9:
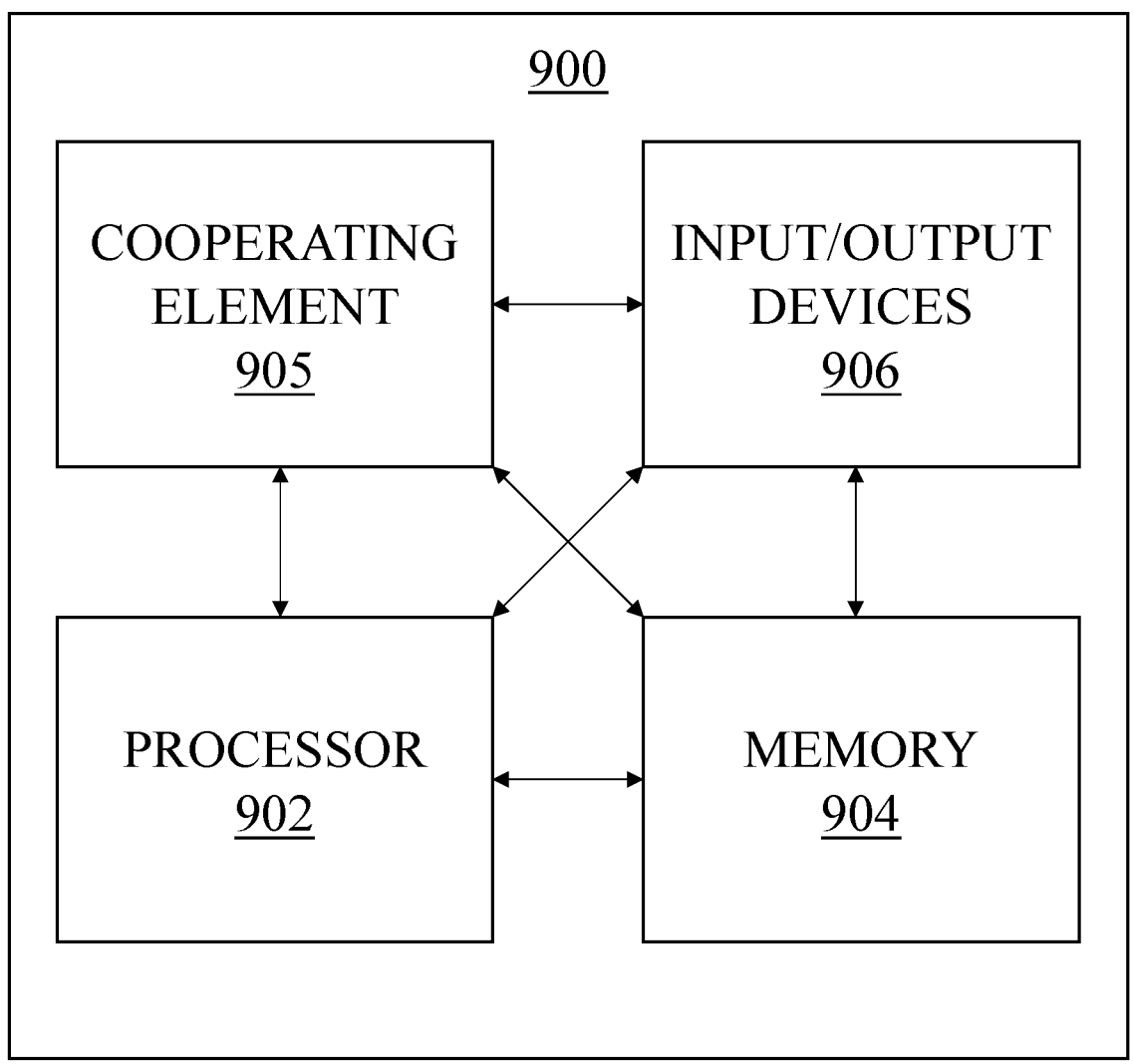
FIG. 9 depicts an example embodiment of a computer suitable for use in performing various functions presented herein.

FIG. 9 depicts an example embodiment of a computer suitable for use in performing various functions presented herein.

The computer 900 includes a processor 902 (e.g., a central processing unit (CPU), a processor, a processor core of a processor, a subset of processor cores of a processor, a set of processor cores of a processor, or the like) and a memory 904 (e.g., a random access memory (RAM), a read-only memory (ROM), or the like). In at least some example embodiments, the computer 900 may include at least one processor and at least one memory storing instructions that, when executed by the at least one processor, cause the computer to perform various functions presented herein.

The computer 900 also may include a cooperating element 905. The cooperating element 905 may be a hardware device. The cooperating element 905 may be a process that can be loaded into the memory 904 and executed by the processor 902 to implement various functions presented herein (in which case, for example, the cooperating element 905 (including associated data structures) can be stored on a non-transitory computer readable medium, such as a storage device or other suitable type of storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 may represent a general architecture and functionality suitable for implementing functional elements described herein, portions of functional elements described herein, or the like, as well as various combinations thereof. For example, computer 900 may provide a general architecture and functionality that is suitable for implementing one or more elements presented herein (e.g., one or more elements of the communication network 110 or a portion of an element of the communication network 110, one or more elements of the signal acquisition system 120 or a portion of an element of the signal acquisition system 120, one or more elements of the signal analysis system 130 or a portion of an element of the signal analysis system 130, or the like, as well as various combinations thereof).

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions which, when executed by the at least one processor, cause the apparatus at least to:
      determine, within a multi-valued waveform recorded from a received signal including a plurality of protocol frames that are based on a protocol, a position of a repeating symbol pattern that repeats across the plurality of protocol frames, wherein the received signal includes data traffic, wherein the multi-valued waveform is recorded from the received signal including the data traffic;
      extract, from the multi-valued waveform based on the position of the repeating symbol pattern, a waveform of the repeating symbol pattern; and
      calculate, based on the waveform of the repeating symbol pattern, a signal integrity metric of the received signal to support signal analysis for the data traffic.

2. The apparatus of claim 1, wherein the position of the repeating symbol pattern is determined using a cross-correlation or convolution with a known symbol pattern of a protocol frame structure of the protocol frames of the protocol.

3. The apparatus of claim 2, wherein the cross-correlation or convolution within the known symbol pattern of the protocol frame structure of the protocol frames of the protocol is performed after application of at least one of upsampling or filtering to the known symbol pattern of the protocol frame structure of the protocol frames of the protocol.

4. The apparatus of claim 1, wherein the protocol is a passive optical network (PON) protocol, wherein the protocol frames are downstream physical PON frames based on a downstream physical PON frame format that includes a downstream physical synchronization block (PSBd), wherein the repeating symbol pattern is located within the PSBd.

5. The apparatus of claim 4, wherein the repeating symbol pattern is one of: a PSync field of the PSBd, at least a portion of a superframe counter (SFC) structure of the PSBd, or at least a portion of an operation control (OC) structure of the PBSd.

6. The apparatus of claim 1, wherein the protocol is a passive optical network (PON) protocol, wherein the protocol frames are upstream physical PON frames based on an upstream physical PON frame format, wherein the repeating symbol pattern is one of an upstream delimiter or an upstream burst preamble.

7. The apparatus of claim 1, wherein the instructions, when executed by the at least one processor, cause the apparatus at least to:
   calculate the signal integrity metric of the received signal based on a signal integrity metric calculation performed based on the waveform of the repeating symbol pattern.

8. The apparatus of claim 1, wherein the instructions, when executed by the at least one processor, cause the apparatus at least to:
   perform waveform processing on the waveform of the repeating symbol pattern to provide a processed waveform; and
   calculate the signal integrity metric of the received signal based on a signal integrity metric calculation performed based on the processed waveform.

9. The apparatus of claim 1, wherein the instructions, when executed by the at least one processor, cause the apparatus at least to:
   calculate a first signal integrity metric based on a first signal integrity metric calculation performed based on the waveform of the repeating symbol pattern;
   perform waveform processing on the waveform of the repeating symbol pattern to provide a processed waveform;
   calculate a second signal integrity metric based on a second signal integrity metric calculation performed based on the processed waveform; and
   calculate the signal integrity metric of the received signal based on processing of the first signal integrity metric and the second signal integrity metric.

10. The apparatus of claim 1, wherein the instructions, when executed by the at least one processor, cause the apparatus at least to:
    obtain, based on the plurality of protocol frames, an eye diagram for the received signal.

11. The apparatus of claim 10, wherein the instructions, when executed by the at least one processor, cause the apparatus at least to:
    calculate the signal integrity metric of the received signal based on a signal integrity metric calculation performed based on the eye diagram for the received signal.

12. The apparatus of claim 10, wherein the instructions, when executed by the at least one processor, cause the apparatus at least to:
    perform eye-related processing on the eye diagram for the received signal to provide a processed eye diagram; and
    calculate the signal integrity metric of the received signal based on a signal integrity metric calculation performed based on the processed eye diagram.

13. The apparatus of claim 10, wherein the instructions, when executed by the at least one processor, cause the apparatus at least to:
    perform signal processing on the waveform of the repeating symbol pattern and the eye diagram for the received signal to provide an output signal; and
    calculate the signal integrity metric of the received signal based on a signal integrity metric calculation performed based on the output signal.

14. The apparatus of claim 1, wherein the instructions, when executed by the at least one processor, cause the apparatus at least to:
    determine, within the multi-valued waveform recorded from the received signal, a second position of a second repeating symbol pattern that repeats across the plurality of protocol frames;
    extract, from the multi-valued waveform based on the second position of the second repeating symbol pattern, a second waveform of the repeating symbol pattern; and calculate, based on the second waveform of the second repeating symbol pattern, the signal integrity metric of the received signal.

15. The apparatus of claim 14, wherein the instructions, when executed by the at least one processor, cause the apparatus at least to:
perform waveform processing on the waveform of the repeating symbol pattern to provide a first processed waveform and on the second waveform of the second repeating symbol pattern to provide a second processed waveform; and
calculate the signal integrity metric of the received signal based on a signal integrity metric computation performed based on the first processed waveform and the second processed waveform.

16. The apparatus of claim 14, wherein the instructions, when executed by the at least one processor, cause the apparatus at least to:
perform waveform processing on the waveform of the repeating symbol pattern to provide a first processed waveform and on the second waveform of the second repeating symbol pattern to provide a second processed waveform;
calculate a first signal integrity metric based on a first signal integrity metric computation performed based on the first processed waveform and the second processed waveform;
calculate a second signal integrity metric based on a second integrity metric computation performed based on the waveform of the repeating symbol pattern and the second waveform of the repeating symbol pattern; and
calculate the signal integrity metric of the received signal based on a signal integrity metric processing configured to adjust the first signal integrity metric based on the second signal integrity metric.

17. The apparatus of claim 1, wherein the signal integrity metric includes at least one of an eye/eye-mask test after equalization (EYE-EQ) metric, a transmitter dispersion eye closure after equalization (TDEC-EQ) metric, or a transmitter dispersion eye closure quaternary after equalization (TDECQ-EQ) metric.

18. An apparatus, comprising:
at least one processor; and
at least one memory storing instructions which, when executed by the at least one processor, cause the apparatus at least to:
determine, within a multi-valued waveform recorded from a received signal including a plurality of protocol frames that are based on a protocol, a position of a repeating symbol pattern that repeats across the plurality of protocol frames, wherein the position of the repeating symbol pattern is determined using matched filtering and threshold qualification;
extract, from the multi-valued waveform based on the position of the repeating symbol pattern, a waveform of the repeating symbol pattern; and
calculate, based on the waveform of the repeating symbol pattern, a signal integrity metric of the received signal.

19. A method, comprising:
determining, within a multi-valued waveform recorded from a received signal including a plurality of protocol frames that are based on a protocol, a position of a repeating symbol pattern that repeats across the plurality of protocol frames, wherein the received signal includes data traffic, wherein the multi-valued waveform is recorded from the received signal including the data traffic;
extracting, from the multi-valued waveform based on the position of the repeating symbol pattern, a waveform of the repeating symbol pattern; and
calculating, based on the waveform of the repeating symbol pattern, a signal integrity metric of the received signal to support signal analysis for the data traffic.

* * * * *